US008238614B2

(12) United States Patent
Konishi

(10) Patent No.: US 8,238,614 B2
(45) Date of Patent: Aug. 7, 2012

(54) IMAGE DATA OUTPUT PROCESSING APPARATUS AND IMAGE DATA OUTPUT PROCESSING METHOD EXCELLING IN SIMILARITY DETERMINATION OF DUPLEX DOCUMENT

(75) Inventor: Yohsuke Konishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 986 days.

(21) Appl. No.: 12/232,896

(22) Filed: Sep. 25, 2008

(65) Prior Publication Data

US 2009/0080782 A1 Mar. 26, 2009

(30) Foreign Application Priority Data

Sep. 26, 2007 (JP) ................................ 2007-250045

(51) Int. Cl.
*G06K 9/62* (2006.01)
(52) U.S. Cl. ....................................... 382/112; 382/218
(58) Field of Classification Search ........................ None
See application file for complete search history.

(56) References Cited

U.S. PATENT DOCUMENTS 5,465,353 A 11/1995 Hull et al.
5,799,115 A 8/1998 Asano et al.
7,366,337 B2 * 4/2008 Kortum et al. ................ 382/135
2007/0097411 A1 * 5/2007 Kondo et al. ................ 358/1.14
2008/0177764 A1 * 7/2008 Kise et al. ..................... 707/100

FOREIGN PATENT DOCUMENTS

JP 05-110815 4/1993
JP 7-282088 10/1995
JP 8-255236 10/1996
JP 11-032213 2/1999
JP 2005-026880 1/2005
WO WO-2006/092957 9/2006

* cited by examiner

*Primary Examiner* — Brian P Werner
(74) *Attorney, Agent, or Firm* — Edwards Wildman Palmer LLP; David J. Silvia

(57) ABSTRACT

In an image data output processing apparatus of the present invention, a storage process section, when a reference document is duplex, stores, at the time of storage, a DocID indicative of the reference document, to correspond to an ID indicative of respective document images on front and back sides of the reference document, and in matching when a matching document is duplex, extracts an ID similar to that of the reference document and a corresponding DocID for each of the document images on the front and back sides of the matching document, to create candidate lists for the front and back sides of the matching document. If first candidates in the candidate lists correspond to an identical DocID, the images are similar to each other, and if first candidates do not correspond to the identical DocID, a determination result is corrected to a reference document corresponding to the identical DocID.

10 Claims, 21 Drawing Sheets

| | | | | | | |
|---|---|---|---|---|---|---|
| −3 | −2 | −1 | 1 | −1 | −2 | −3 |
| −2 | −2 | 1 | 4 | 1 | −2 | −2 |
| −1 | 1 | 8 | 15 | 8 | 1 | −1 |
| 1 | 5 | 16 | 25 | 16 | 5 | 1 |
| −1 | 1 | 8 | 15 | 8 | 1 | −1 |
| −2 | −2 | 1 | 4 | 1 | −2 | −2 |
| −3 | −2 | −1 | 1 | −1 | −2 | −3 |

| HASH VALUE | IMAGE INDEX |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 12 (b)

| HASH VALUE | IMAGE INDEX |
|---|---|
| H1 | ID1、ID1 |
| H2 | ID1 |
| H3 | ID1、ID2 |
| H4 | ID1 |
| H6 | ID1、ID2 |
| ⋮ | ⋮ |

| IMAGE INDEX | SIDE INFORMATION | DOCUMENT INDEX |
|---|---|---|
| ID1 | 1 | DocID1 |
| ID2 | 1 | DocID2 |
| ID3 | 2 | DocID2 |
| ID4 | 1 | DocID3 |
| ID5 | 2 | DocID3 |
| ⋮ | ⋮ | ⋮ |

FIG. 16 (a)

FRONT SIDE CANDIDATE LIST

| | IMAGE INDEX | DOCUMENT INDEX | SIDE INFORMATION | NUMBER OF VOTES OBTAINED |
|---|---|---|---|---|
| FIRST CANDIDATE | ID4 | DocID3 | 1 | $N_1$ |
| SECOND CANDIDATE | ID10 | DocID7 | 2 | $N_2$ |
| THIRD CANDIDATE | ID15 | DocID10 | 2 | $N_3$ |
| FOURTH CANDIDATE | | | | |
| | | | | |

FIG. 16 (b)

BACK SIDE CANDIDATE LIST

| | IMAGE INDEX | DOCUMENT INDEX | SIDE INFORMATION | NUMBER OF VOTES OBTAINED |
|---|---|---|---|---|
| FIRST CANDIDATE | ID5 | DocID3 | 2 | $n_1$ |
| SECOND CANDIDATE | ID0 | DocID0 | 2 | |
| THIRD CANDIDATE | | | | |
| FOURTH CANDIDATE | | | | |
| | | | | |

FIG. 17

MATCHING RESULT

| | |
|---|---|
| FRONT SIDE | ID4 |
| BACK SIDE | ID5 |

FIG. 18 (a)

FRONT SIDE CANDIDATE LIST

| | IMAGE INDEX | DOCUMENT INDEX | SIDE INFORMATION | NUMBER OF VOTES OBTAINED |
|---|---|---|---|---|
| FIRST CANDIDATE | ID15 | DocID10 | 2 | $N_{100}$ |
| SECOND CANDIDATE | ID7 | DocID5 | 2 | $N_{101}$ |
| THIRD CANDIDATE | ID10 | DocID7 | 2 | $N_{102}$ |
| FOURTH CANDIDATE | | | | |

FIG. 18 (b)

BACK SIDE CANDIDATE LIST

| | IMAGE INDEX | DOCUMENT INDEX | SIDE INFORMATION | NUMBER OF VOTES OBTAINED |
|---|---|---|---|---|
| FIRST CANDIDATE | ID21 | DocID15 | 2 | $n_{100}$ |
| SECOND CANDIDATE | ID14 | DocID10 | 1 | $n_{101}$ |
| THIRD CANDIDATE | ID12 | DocID9 | 1 | $n_{102}$ |
| FOURTH CANDIDATE | | | | |

FIG. 19

MATCHING RESULT

| | |
|---|---|
| FRONT SIDE | ID15 |
| BACK SIDE | ID21 |

↓

CORRECTED MATCHING RESULT

| | |
|---|---|
| FRONT SIDE | ID15 |
| BACK SIDE | ID14 |

IMAGE DATA OUTPUT PROCESSING APPARATUS AND IMAGE DATA OUTPUT PROCESSING METHOD EXCELLING IN SIMILARITY DETERMINATION OF DUPLEX DOCUMENT

This Nonprovisional application claims priority under U.S.C. §119(a) on Patent Application No. 250045/2007 filed in Japan on Sep. 26, 2007, the entire contents of which are hereby incorporated by reference.

FIELD OF THE INVENTION

The present invention relates to an image data output processing apparatus which carries out output processes such as a copying process, a transmitting process, an editing process, or a filing process, each with respect to an input image data. More specifically, the present invention relates to an image data output processing apparatus which has a function for determining a similarity by comparing an image of the input image data with an image of a reference document that is stored in advance, so as to control an output process of the input image data based on a determination result of the similarity.

BACKGROUND OF THE INVENTION

There have been proposed image matching techniques for comparing image data of a document obtained by reading the document by use of a scanner or the like with image data of a preliminarily stored reference document, so as to determine a similarity between the image data and the preliminarily stored image data.

Examples of the method for determining a similarity include: a method in which a keyword is extracted from an image with OCR (Optical Character Reader) so as to carry out matching with the keyword; a method in which only a ruled line image having a ruled line is focused on as a target image, and matching is carried out with features of the ruled line (see Patent Document 1); and a method in which a similarity is determined based on color distributions of an input image and a reference document (see Patent Document 2).

Patent Document 3 discloses a technique in which a descriptor is formed from features of an input document, and matching between the input document and a document stored in a document database is carried out by use of the descriptor and a descriptor database in which descriptors are stored and which indicates a list of documents including features from which the descriptors are formed. A descriptor is selected such that the descriptor is invariant for distortions generated by digitalization of a document and differences between an input document and a document used for matching in a document database.

In this technique, when the descriptor database is scanned, votes for each document in the document database are accumulated, and a document having the maximum number of votes obtained or a document whose number of votes exceeds a threshold value is used as a matched document.

Further, Patent Document 4 discloses a technique in which a plurality of feature points are extracted from a digital image, a set of local feature points are determined out of the extracted feature points, a subset of feature points is selected out of the determined set of local feature points, invariants relative to geometric transformation each as a value characterizing the selected subset are calculated in accordance with plural combinations of feature points in the subset, features are calculated from combinations of each of the calculated invariants, and a document and an image corresponding to the digital image data is searched by voting documents and images having the calculated features stored in a database.

Conventionally, in an image data output processing apparatus, e.g., a copying machine, a facsimile device, a scanning device, or a multi-function printer, which carries out, with respect to input image data, an output process such as a copying process, a transmitting process, an editing process, or a filing process, when it is determined that an input image data is similar to an image data of a reference document by use of such the document matching techniques, its output process is controlled.

For example, there has been known techniques of a color image forming apparatus as anti-counterfeit techniques with respect to a paper currency or a valuable stock certificate, in which it is determined whether or not input image data is identical with an image data of a paper currency or a valuable stock certificate (reference document) in accordance with a pattern detected from the input image data, and when it is determined that the input image data is identical with the image data of the reference document, (i) a specified pattern is added to an output image so that an image forming apparatus that has made a copy of the image data can be specified from the output image, (ii) a copied image is blacked out, or (iii) a copying operation is prohibited with respect to the input image data.

[Patent Document 1]

Japanese Unexamined Patent Publication No. 255236/1996 (Tokukaihei 8-255236) (published on Oct. 1, 1996)

[Patent Document 2]

Japanese Unexamined Patent Publication No. 110815/1993 (Tokukaihei 5-110815) (published on Apr. 30, 1993)

[Patent Document 3]

Japanese Unexamined Patent Publication No. 282088/1995 (Tokukaihei 7-282088) (published on Oct. 27, 1995)

[Patent Document 4]

International Publication No. WO2006/092957, pamphlet (published on Sep. 8, 2006)

However, the conventional image data output processing apparatuses do not carry out determination on a basis that a document is duplex, even if the input image data is of a duplex document. As a result, a problem occurs that an output process that is to be regulated is actually permitted, caused by the inability to determine that the input image data is a document image of which an output process is to be regulated.

The following description explains this case with reference to FIG. 25. The conventional image data output processing apparatuses carry out matching of the documents basically by units of one page. Therefore, as illustrated in FIG. 25, even in a case where a matching document is a duplex document A that has document images X and Y on a front side and a back side of the duplex document A, respectively, similarities of the document image X on the front side and the document image Y on the back side, each with respect to reference images, are individually determined as independent document images. As such, an attribute of the duplex document is not utilized.

Therefore, as illustrated in FIG. 25, in a case where the duplex document A that has, on the front and back sides of the duplex document A, the document image X and the document image Y, respectively, which document images X and Y are prohibited in carrying out an output process, even if the document image X on the front side of the duplex document A is determined as similar to a reference image X, if the document image Y on the back side of the duplex document A is determined as having a low similarity to a reference image Y, thereby determining that the document image Y is not similar to the reference image Y, the output process is likely to be permitted for the document image Y.

SUMMARY OF THE INVENTION

In the above case, if determination is to be made provided with information that a reference document having the reference image X is a duplex document, and that the reference image Y is on a back side of that reference document, prohibition of the output process of the document image Y is possible by correcting a determination with respect to the document image Y on the back side of the reference document.

An object of the present invention is to realize an image data output processing apparatus which can reliably control an output process of input image data in a case where the input image data is of a duplex document and includes a document image in which an output process is regulated, for an image data output processing apparatus which determines whether or not an image of the input image data is similar to an image of a reference document so as to control the output process of the input image data depending on a determination result of the similarity between the image of the input image data and the image of the reference document.

In order to attain the above object, an image data output processing apparatus of the present invention carries out an output process with respect to input image data, the image data output processing apparatus including: an image matching section that (i) extracts features of an image of the input image data and (ii) carries out a determination as to a similarity between the image of the input image data and an image of a reference document based on a comparison made between the features extracted and features of the image of the reference document stored in advance; and an output process control section that controls the output process with respect to the input image data based on a determination result made by the image matching section, wherein the image matching section carries out a matching of the image of the input image data by use of a storage section which stores (i) features of each of images on a front side and a back side of a duplex reference document and (ii) an index for identifying a duplex document including the reference image, the index being stored so as to correspond to an index for identifying each of the images on the front side and the back side of the duplex document, the image matching section further including: a voting process/candidate list creation section that extracts, in a case where the input image data is of a duplex document, for each of the images on the front side and the back side of the duplex document, (i) a reference image index of a reference image having a similarity which is not less than a predetermined value from the storage section and (ii) a reference document index corresponding to the reference image index from the storage section, so as to create a front side candidate list and a back side candidate list; and a duplex document determination process section that determines, in a case where each of the front and back side candidate lists created include a reference image index that corresponds to an identical reference document index, that the images on the duplex document of the input image data are similar to the reference images that correspond to the identical reference document index, respectively.

According to the arrangement, in a case where a reference document is duplex, an attribute of the reference document as a duplex document is included as one element in determining a similarity with the reference document. In a case where a matching document is duplex, determination of the reference document is possible by including the attribute that the matching document is a duplex document. As a result, accuracy in determining the similarity with respect to a duplex document is improved.

Namely, in the case where the reference document is duplex, an index for identifying a duplex document including the reference image (one example: document index DocID later described) is stored in a storage section so as to correspond to an index for identifying each image on a front side and a back side of the duplex reference document (one example: equivalent to an image index ID later described).

This allows unique specification of a duplex document which includes the images on the front and back side of the duplex document.

In matching images, a voting process/candidate list creation section, in the case where the matching document is duplex, extracts, from a storage section, for each of the images on the front side and the back side of the duplex document, (i) a reference image index of the reference image having a similarity which is not less than a predetermined value, and (ii) a reference document index corresponding to the reference image index, so as to create a front side candidate list and a back side candidate list.

Although dependent on a degree of the similarity, a plurality of reference images that are possibly similar to the images on the front and back sides of the matching document are extracted so as to be included in a front side candidate list and a back side candidate list created as such. Of course, if the images are not similar to the reference image, or the degree of the similarity is low except for one reference image, the number of candidates that are listed on the candidate list may be none or one.

Accordingly, a duplex document determination process section determines, in a case where each of the front and back side candidate lists created include a reference image index that corresponds to an identical reference document index, that the images on the duplex document inputted in the matching mode are similar to the reference images in the candidate lists that correspond to the identical reference document index.

As a result, determination accuracy is improved in a case where the matching document is duplex and is similar to (matches) the reference document, while avoiding mistaken determination such as determining an image on one side of the matching document as similar to an image on one side of the reference document whereas an image on the other side of the matching document is determined as different to an image on the other side of the reference document.

That is to say, in the case where a reference document is duplex, the reference image is determinable on a basis that the reference document is duplex. Therefore, determination accuracy of similarity is improved with respect to a duplex document.

Therefore, it is possible to provide an image data output processing apparatus which can reliably control an output process, in a case where input image data is of a duplex document, and, for example, includes an image in which an output process is to be controlled such as regulation of the output process.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 12(*a*) and 12(*b*) are explanatory drawings each illustrating an example of a hash value of each feature point stored in a hash table and an index indicative of input image data.

FIG. 16(*a*) is an explanatory drawing illustrating an example of a front side candidate list that is created by a voting process/candidate list creation section, provided in a document matching process section in the image data output processing apparatus illustrated in FIG. 2. FIG. 16(*b*) is an explanatory drawing illustrating an example of a back side candidate list corresponding to the front side candidate list illustrated in FIG. 16(*a*).

FIG. 17 is an explanatory diagram illustrating one example of a matching result determined by a similarity determination process section, provided in a document matching process section in the image data output processing apparatus illustrated in FIG. 2, and illustrates a matching result of the front and back side candidate lists illustrated in FIGS. 16(*a*) and 16(*b*).

FIG. 18(*a*) is an explanatory diagram illustrating another example of a front side candidate list that is created by a voting process/candidate list creation section, provided in a document matching process section in the image data output processing apparatus illustrated in FIG. 2. FIG. 18(*b*) is an explanatory diagram illustrating an example of a back side candidate list corresponding to the front side candidate list illustrated in FIG. 18(*a*).

FIG. 19 is an explanatory diagram illustrating an example of a matching result correction section correcting a matching result determined by a similarity determination process section provided in a document matching process section in the image data output process apparatus illustrated in FIG. 2, and illustrates a matching result of the front and back side candidate lists illustrated in FIGS. 18(*a*) and 18(*b*).

DESCRIPTION OF THE EMBODIMENTS

One embodiment according to the present invention is explained below with reference to FIGS. 1 to 21. Explained in the embodiment is a case where the present invention is applied to a digital color copying machine, however, the present invention is not limited to this.

Figure 2:
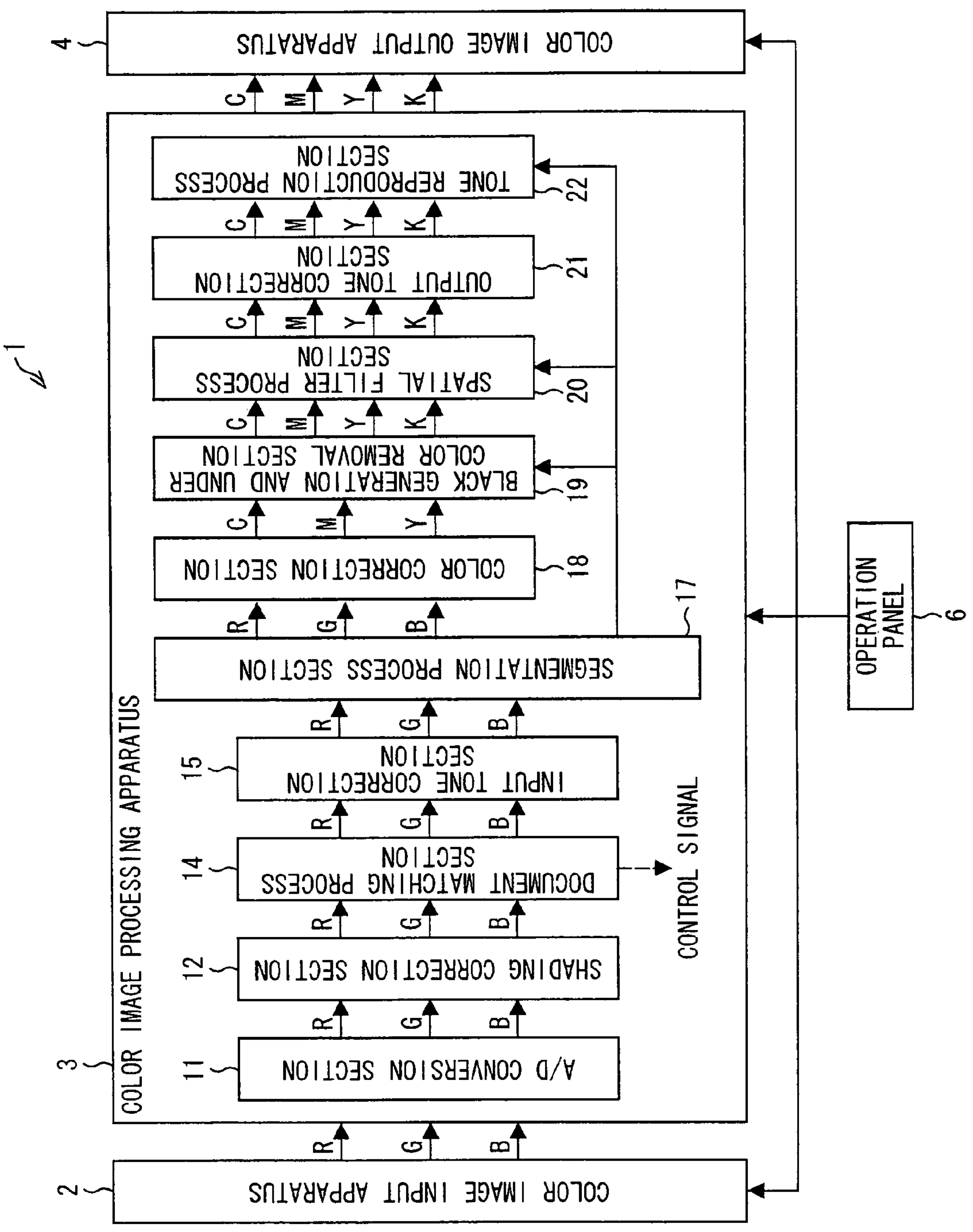
FIG. 2 is a block diagram schematically illustrating an image output processing apparatus as a digital color copying machine according to one embodiment of the present invention.

FIG. 2 is a block diagram schematically illustrating a digital color copying machine (image data output processing apparatus) 1 according to the present embodiment.

As illustrated in FIG. 2, the digital color copying machine 1 includes a color image input apparatus 2, a color image processing apparatus 3, a color image output apparatus 4, and an operation panel 6.

The color image input apparatus 2 that reads out an image of a document and generates image data, is, for example, composed of a scanner section (not illustrated) including a device such as a CCD (Charge Coupled Device) for converting optical information into an electric signal. The color image input apparatus 2 reads an optical image reflected from a document as RGB (R: red, G: green, B: blue) analog signals and supplies the RGB analog signals to the color image processing apparatus 3.

The color image processing apparatus 3 carries out various processes with respect to the analog signals received from the color image input apparatus 2 so that the analog signals are converted into a format that can be handled by the color image output apparatus 4, and supplies the signals that are processed to the color image output apparatus.

The color image processing apparatus 3 includes, at an input stage thereof, an A/D (Analog/Digital) conversion section 11 for converting RGB analog signals into digital signals. The A/D conversion section 11 converts the image data in the form of the analog signals received by the color image processing apparatus 3 into digital signals.

The RBG signals converted into the digital signals are then transmitted to a shading correction section 12, a document matching process section 14, an input tone correction section 15, a segmentation process section 17, a color correction section 18, a black generation and under color removal section 19, a spatial filter process section 20, an output tone correction section 21, and a tone reproduction process section 22 in this order. Ultimately, the RGB signals are converted into CMYK digital signals. The CMYK digital signals outputted from the tone reproduction process section 22 are temporarily stored in a memory (not illustrated), and then supplied to the color image output apparatus 4.

The following explanation deals with each process of the sections constituting the color image processing apparatus 3. The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density (pixel value) signal which can be processed easily by an image processing system used in the color image processing apparatus 3.

The RGB signals (RGB density signals) whose various distortions have been removed and color balance has been adjusted by the shading correction section 12 are then supplied to the document matching process section 14.

The document matching process section (similarity determination section, output process control section) 14 has a function of extracting feature points from the RGB signals (input image data) transmitted from the shading correction section 12, so as to extract features of an image of the input image data based on each of the feature points that are extracted.

In a storage mode, the document matching process section 14 (i) extracts features of an image from image data of a reference document that is to be received, and (ii) stores, in storage means, the features extracted, together with (a) an image index ID indicative of a reference image, (b) a document index Doc ID indicative of a reference document including the reference image, and (c) side information indicative of whether the reference image is on a front side or a back side of the reference document, as later described.

In a matching mode, the document matching process section 14 (i) extracts features from image data of a matching document that is to be received, and (ii) carries out a similarity determination process determining whether or not an image of the matching document (hereinafter also referred to as a matching image) is similar to the reference image based on a comparison made between the features extracted and features of a preliminarily stored reference image.

In the matching mode, in a case where the matching document is duplex, the present embodiment carries out a matching by utilizing an attribute of the duplex document, by use of (i) the image index ID indicative of the reference image, (ii) the document index DocID indicative of the reference document including the reference image, and (iii) the side information indicative of whether the reference image is on the front side or the back side of the reference document.

Moreover, the document matching process section 14 also functions as an output process control section. When it is determined that the image of the input image data is similar to the reference document in the similarity determination process, the document matching process section 14 supplies a control signal to control an output process such as prohibiting an output process with respect to the input image data (an image forming process in the case of the color copying machine).

Meanwhile, the document matching process section 14 transmits the input signals as received, without any modification, to the input tone correction section 15.

The input tone correction section 15 removes background color (density component of the background: background density) from the RGB signals transmitted from the document matching process section 14, and adjusts image quality such as contrast. The RGB signals that have been subjected to an image quality adjustment process in the input tone correction section 15 are sent to the segmentation process section 17.

The segmentation process section 17 separates each pixel of an input image into either one of a text region, a halftone dot region, or a photograph (continuous tone) region, according to the RGB signals. On the basis of a result of the separation, the segmentation process section 17 outputs a segmentation class signal, indicating which region a pixel of the input image belongs to, to the color correction section 18, the black generation and under color removal section 19, the spatial filter process section 20, and the tone reproduction process section 22. The segmentation process section 17 also outputs the input signals as received from the input tone correction section 15 to the subsequent color correction section 18 without any modification.

The color correction section 18 removes color impurity on the basis of spectral characteristics of CMY (C: Cyan, M: Magenta, and Y: Yellow) color materials including an unnecessarily absorption component, in order to realize a faithful color reproduction.

The black generation and under color removal section 19 performs (i) a black generation process for generating a black (K) signal from three color (CMY) signals after the color correction processing and (ii) a generation process of new CMY signals by removing the K signal obtained by the black generation processing from the original CMY signals. As a result, the three CMY signals are converted into four CMYK signals.

With the use of a digital filter, the spatial filter process section 20 performs a spatial filter processing on the basis of a segmentation class signal, with respect to the image data received in the form of the CMYK signals from the black generation and under color removal section 19. In the spatial filter processing, the spatial filter process section 20 corrects a spatial frequency characteristic, so as to reduce blur or granularity deterioration in an output image. The tone reproduction process section 22, as with the spatial filter process section 20, performs a predetermined process with respect to the image data in the form of the CMYK signals, on the basis of the segmentation class signal.

For example, in the region separated into a text region by the segmentation process section 17, the spatial filter process section 20 strongly emphasizes a high frequency component in an edge enhancement process of a spatial filter process, in order to improve reproducibility of a black text or a color text especially. Concurrently, the tone reproduction process section 22 selects either a binarization process or a multi-level dithering process on a high-resolution screen suitable for reproducing the high frequency component.

In the region separated into a halftone dot region by the segmentation process section 17, the spatial filter process section 20 performs a low pass filter processing for removing an input halftone dot component. The output tone correction section 21 performs the output tone correction processing in which a signal such as a density signal is converted into a halftone dot area rate that is characteristics of the color image output apparatus 4. Subsequently, the tone reproduction process section 22 performs the tone reproduction processing (halftone generation) so that, ultimately, an image is segmented into pixels and each tone of the pixels can be reproduced. In the region separated into a photograph region by the segmentation process section 17, the binary processing or the multi-level dithering processing is performed on a screen suitable for tone reproduction.

The image data that has been subjected to each of the processes mentioned above is temporarily stored in a memory (not illustrated). The image data is read out from the memory at a predetermined timing and supplied to the color image output apparatus 4.

Then, the input image data is subjected to the similarity determination process by the document matching process section 14, in the matching mode. In a case where there is a similarity between the image of the input image data and a reference image, a control signal to prohibit the output process with respect to the input image data is supplied. In this case, when the image data is read out from the memory, a data value of the image data in a relevant page is replaced by "0" or "255" (in a case of 8 bit), so that the image is made invisible. This causes an outputted object that is outputted from the color image output apparatus 4 to be in a state in which a whole page is blacked out or is in blank. Alternatively, if a control signal which prohibits an output process of a matching image is outputted, the output may be stopped (nothing is outputted).

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The operation panel 6 includes, for example, a display section (not illustrated) such as a liquid crystal display and setting buttons (not illustrated). The operation panel 6 causes the display section to display information corresponding to an instruction of a main control section (not illustrated) of the digital color copying machine 1 and transmits information, inputted by the user with use of the setting buttons, to the main control section. The user can input, via the operation panel 6, a processing request, the number of images to be processed and the like with respect to the image data.

The main control section is composed of a CPU (Central Processing Unit) and the like for example. In accordance with a program or various data stored in a ROM (not illustrated) or the like and information entered from the operation panel 6, the main control section controls each operation of each section of the digital color copying machine 1.

The following description explains an arrangement of an image reading apparatus provided in the color image input apparatus 2, which scans a document image and captures image information as image data.

Figure 20:
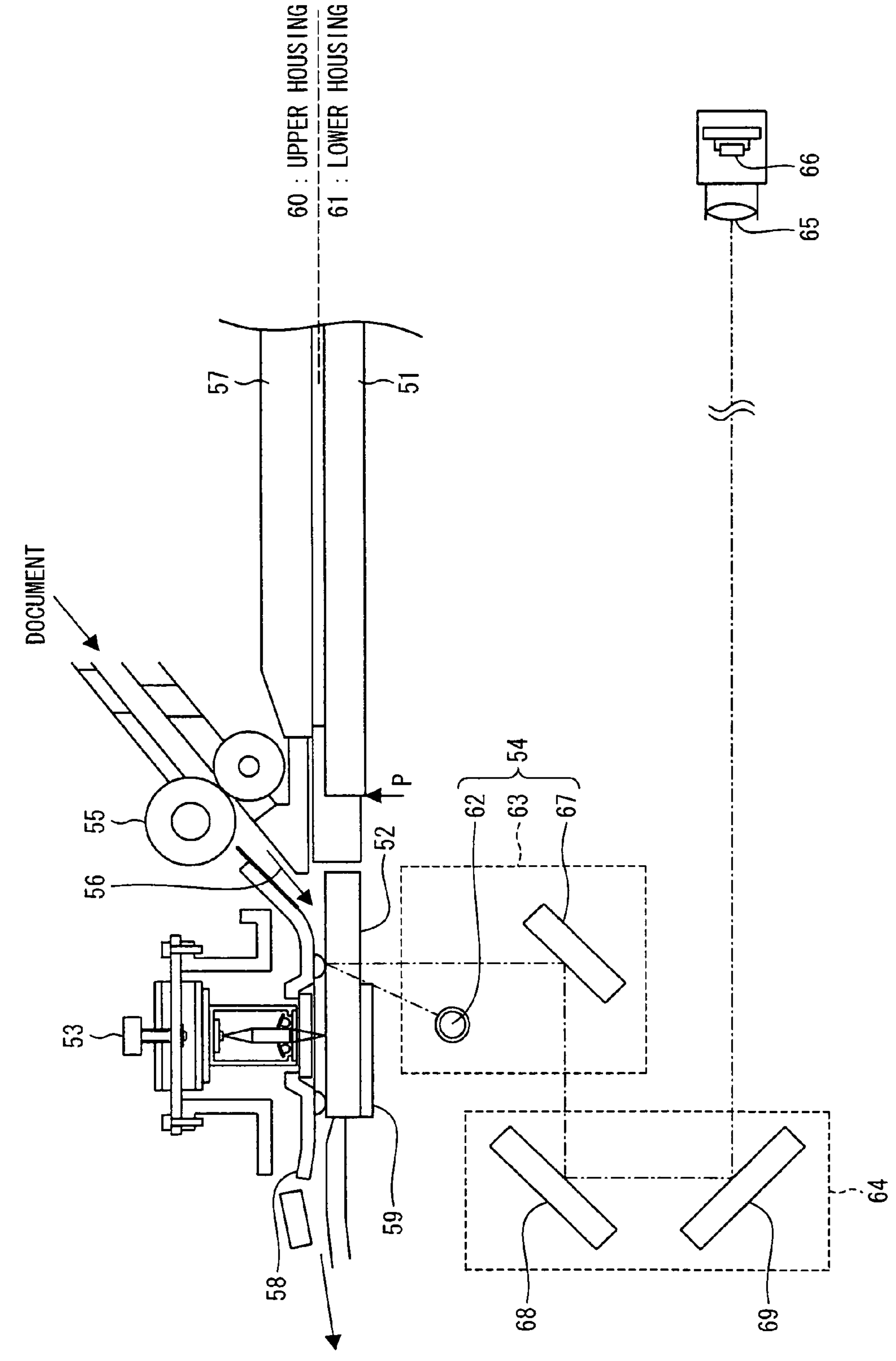
FIG. 20 is an explanatory diagram illustrating an arrangement of an image reading apparatus installed in a color image input apparatus provided in the image data output processing apparatus illustrated in FIG. 2.

FIG. 20 is an explanatory drawing illustrating an arrangement of an image reading apparatus 50 provided in the color image input apparatus 2. As illustrated in FIG. 20, the image reading apparatus 50 includes an image sensor section 53 and a reading section 54. The image sensor section 53 reads out an image on an upper side of a document which travels past an upper surface of a second contact glass 52. The reading section 54 scans a document placed on a first contact glass 51 so as to read out the document.

This arrangement enables the image reading apparatus 50 to read out an image on a document in three types of modes: a stationary reading mode which reads out an image from a stationary document; a traveling reading mode which reads out an image while a document is traveled; and a duplex document mode which reads out images on a front and back sides of a document.

Use of an ADF (Auto Document Feeder) is one method for traveling the document on the second contact glass 52, for example. When a document is carried along a document carrying path 56 illustrated in FIG. 20 by use of the ADF or the like, a pair of adjustment rollers 55 bends the document to a predetermined degree. This bend is caused by a tip of the document carried hitting a nip section of the pair of adjustment rollers 55. Subsequently, the pair of adjustment rollers 55 rotates so that the document is carried to a downstream of the image reading apparatus 50. At this time, the nip section of the pair of adjustment rollers 55 adjusts the document so that the tip of the document is perpendicular to a carrying direction.

A reference numeral 57 in FIG. 20 denotes a document holding mat 57 for holding a document placed on the first contact glass 51. The reference numeral 58 in FIG. 20 is a guide for a document that is carried by the ADF or the like. The reference numeral 59 is a light shielding member so as to prevent light of a light source in the reading section 54 to come into the image sensor section 53. Light coming into the image sensor section 53 causes difficulty in reading out the document at an appropriate depth.

The members of the above such as the document holding mat 57, the pair of matching rollers 55, the document carrying path 56, the image sensor section 53, and the upper document carrying guide 58 construct an upper housing (document cover) 60, and the first contact glass 51, the second contact glass 52, and the reading section 54 construct a lower housing 61. The upper housing 60 is provided so that the upper housing 60 can be opened with respect to the lower housing 61.

The reading section 54 is composed of a first scanning unit 63, a second scanning unit 64, an image forming lens 65, and a CCD (Charge Coupled Device) 66. The first scanning unit 63 exposes a document to light while moving along the first contact glass 51 from left to right in a constant speed V. The first scanning unit 63 includes a light source (exposure lamp) 62, and a first reflection mirror 67 that guides light reflected from the document to the second scanning unit 64.

The second scanning unit 64 moves so as to track the first scanning unit 63 at a speed V/2. The second scanning unit 64 includes second and third reflection mirrors 68 and 69, each of which guides light from the first reflection mirror 67 to the image forming lens 65 and the CCD 66.

The image forming lens 65 forms an image on the CCD 66 by use of the light reflected from the third reflection mirror 69. The CCD 66 converts the light from the image forming lens 65 to an analog electric signal. This electric signal is converted into digital image data by an image processing apparatus later described.

The second contact glass 52 is a bed to place a document to be read out in the traveling reading mode or the duplex reading mode. In a case where a document is read out in the traveling reading mode or the duplex reading mode, the reading section 54 moves from a home position (not illustrated) to a position of the second contact glass 52 in FIG. 20. In a case where the document is read out by the stationary reading mode, the reading section 54 moves a predetermined distance according to a document size detected by document size detection means (not illustrated), from a position P in FIG. 20.

Furthermore, in a case where the document is read out by the duplex reading mode, for example when a front side of the duplex document is set to be read out by the reading section 54, image data read out by the reading section 54 is first received by the image processing apparatus, and subsequently, image data read out by the image sensor section 53 is received by the image processing apparatus. While the image data read out by the reading section 54 is processed in the image processing apparatus, the image data read out by the image sensor section 53 is stored in a memory. After the processing of the image data read out by the reading section 54 is completed, the image data read out by the image sensor section 53 is retrieved from the memory in order to carry out processing.

The document size detection means may be arranged, for example, so that a document size of a document placed on a scanner platen is detected in a main scanning direction and a sub scanning direction by use of photoelectric conversion elements such as a phototransistor placed in the image input apparatus, or so that a size of the document is detected (CPU) by detecting a size selected by a user via an operation panel.

The following explanation deals with the document matching process section (image matching section, output process control section) 14 in detail. The document matching process section 14 according to the present embodiment extracts plural feature points from the input image data, and determines a set of local feature points relative to each of the extracted feature points. Then, the document matching process section 14 selects a subset of feature points out of the determined set of local feature points, and calculates invariants each of which is relative to geometric transformation as a value characterizing the selected subset in accordance with plural combinations of feature points in the subset. Subsequently, a hash value indicative of features (feature vectors) is calculated for each feature point by combining each of the invariants that are calculated.

In the storage mode in which the input image data is of the reference document, the hash value that is calculated is stored in a hash table (not illustrated) so as to correspond to an image index ID indicative of a reference image. Further, in a case where the document to be stored is duplex, (i) a document index DocID which is an index for identifying a duplex document including the reference image and (ii) side information indicative of on which side the reference image is on, are stored in a duplex document management table (not illustrated) so as to correspond to the image index ID for identifying each of the document images on the front and back sides of the duplex document.

On the other hand, in the matching mode in which the input image data is of the matching document, voting is carried out for an image index corresponding to the hash value that is calculated. After the voting is completed, a similarity is determined between the matching image and the reference document, based on a vote result, and with reference to the document index and its side information.

The input image data that can possibly be the reference document and the matching document, other than image data of a document read out and inputted by a scanner, may be electronic data created by use of a computer (software), for example, electronic data that is created by entering required items to an electronically formatted data by use of a computer. Further, when considering actual use, the input image data may possibly be (i) electronic data obtained by scanning a document and (ii) data directly created by electronic data (electronic application).

Figure 3:
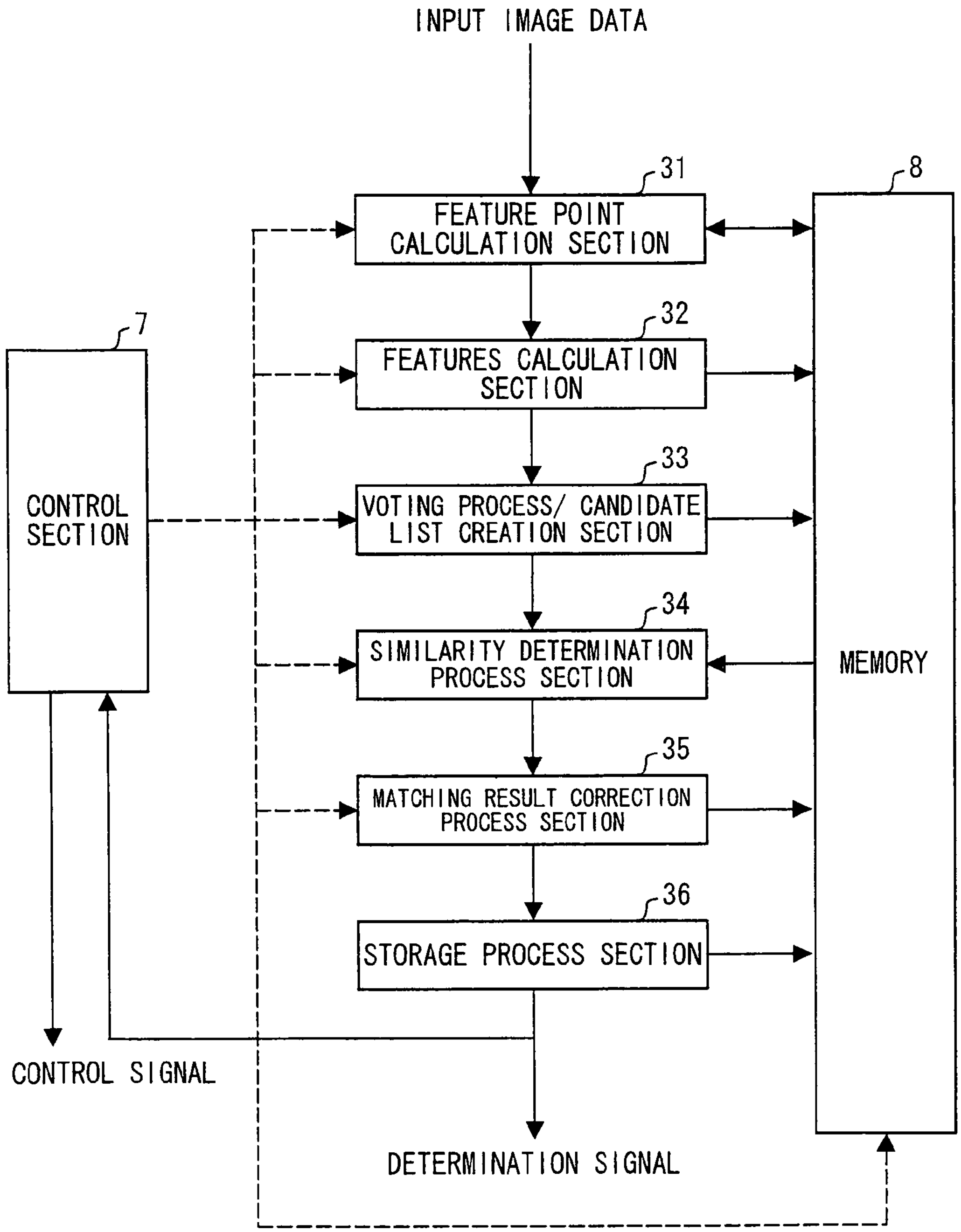
FIG. 3 is a block diagram schematically illustrating an arrangement of a document matching process section provided in an image data output processing apparatus illustrated in FIG. 2

FIG. 3 is a block diagram schematically illustrating an arrangement of the document matching process section 14. As illustrated in FIG. 3, the document matching process section 14 includes a feature point calculation section 31, a features calculation section 32, a voting process/candidate list creation section 33, a similarity determination process section 34, a matching result correction process section (determination result correction process section) 35, a storage process section 36, a control section 7, and a memory 8.

The control section 7 controls operations of the sections of the document matching process section 14. Note that, the control section 7 may be provided in the main control section for controlling operations of the sections of the digital color copying machine 1 or may be provided separately from the main control section so as to cooperate with the main control section in controlling operations of the document matching process section 14.

When it is determined that there is no similarity (an image of the input image data is not identical with the reference image) in accordance with a result of the similarity determination process by the document matching process section 14, the control section 7 supplies a control signal to permit an output process with respect to the image data. On the other hand, when it is determined that there is a similarity (an image of the input image data is identical with the reference image), the control section 7 supplies a control signal to control an output process with respect to the image data (hereinafter referred to as the input image data).

In controlling (regulating) the output process, contents of a limit is set for each reference image. The most highly prioritized and strict limit is prohibition of the output process. The control section 7 has two modes in regulating the output process, for a case where the matching document is duplex.

One mode is a regular mode, in which the output process is regulated for just a document image that is determined as similar to a reference image, among the document images on the front and back sides of the duplex document.

The other mode is a forced mode, which is stricter than the regular mode. The forced mode applies a limit that is set to a reference image which is determined similar to a document image, to the output processes of both document images on the front and back sides of a duplex document, even in a case where just one of the document images on the front and back sides of the duplex document is determined similar to the reference image. Further, if both document images on the front and back sides of the duplex document which have different regulation contents are determined as similar to reference images, respectively, a regulation having a highest priority (the most strict limit) is selected. For example, if the document image on one of the front and back sides of the duplex document is determined as similar to a reference image which prohibits an output process, a control signal which causes both the front and back sides of the duplex document to be invisible is outputted.

The memory 8 stores various data to be used in processes of the sections of the document matching process section 14, process results, and the like. Tables such as a hash table later described and the duplex document management table (storage section) are provided in the memory 8.

The feature point calculation section 31 extracts a connected part of a text string or a line from the input image data and calculates a centroid of the connected part as a feature point. Note that in the storage mode, the input image data indicates image data of a document to be stored. On the other hand, in the similarity determination process, the input image data indicates image data of a document to be matched (hereinafter also referred to as matching image data in some cases).

Figure 4:
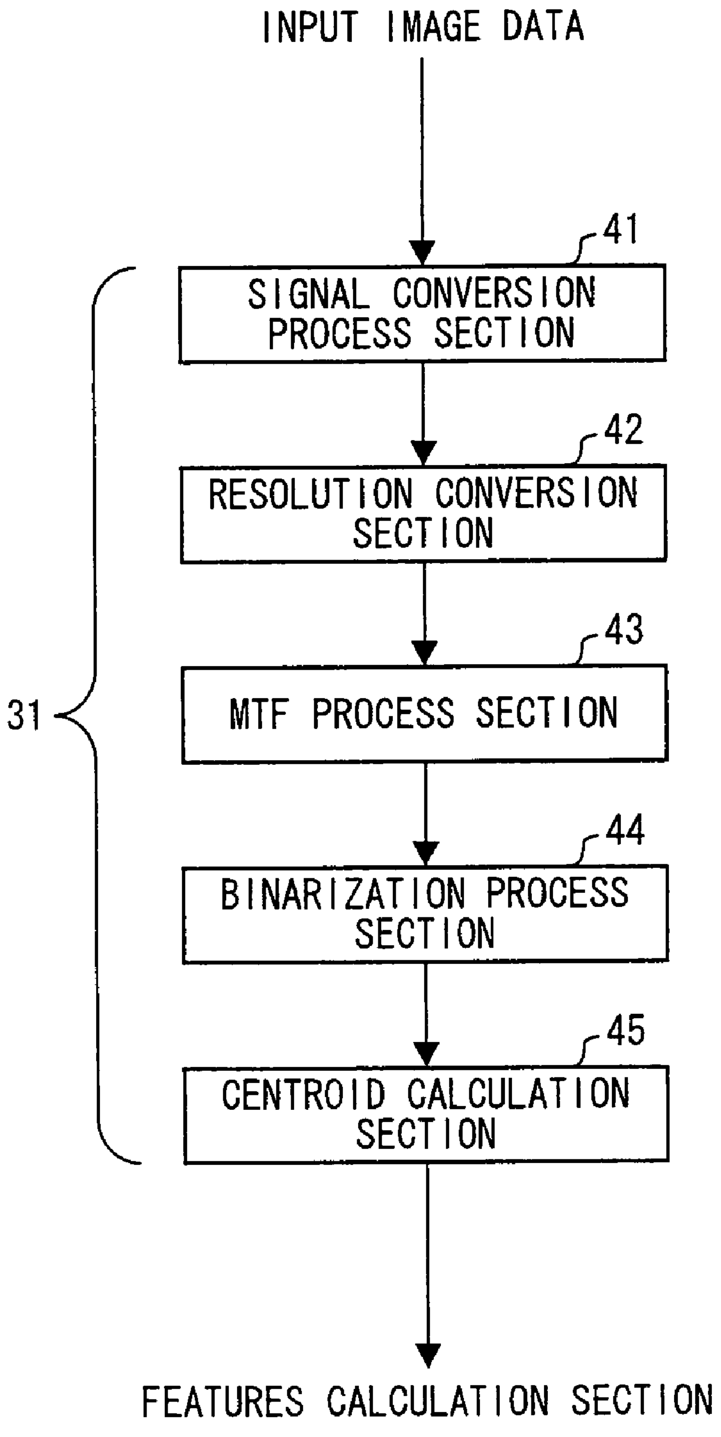
FIG. 4 is a block diagram schematically illustrating a feature point calculation section provided in the image data output processing apparatus illustrated in FIG. 2.

FIG. 4 is a block diagram schematically illustrating an arrangement of the feature point calculation section 31. The arrangement illustrated in FIG. 4 is one exemplary arrangement of the feature point calculation section 31, and not limited to this. For example, a feature point may be calculated by various conventional methods.

As illustrated in FIG. 4, the feature point calculation section 31 includes a signal conversion process section 41, a resolution conversion section 42, an MTF process section 43, a binarization process section 44, and a centroid calculation section 45.

In case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Yj=0.30Rj+0.59Gj+0.11Bj \quad (1)$$

"Yj" refers to a luminance signal of each pixel, and each of "Rj", "Gj", and "Bj" is a color component of the RGB signals, and "j" subsequently added to "Y", "R", "G", and "B" represents a value given to each pixel (j is an integer not less than 1).

Alternatively, the RGB signals may be converted into CIE1976L*a*b* signal (CIE: Commission International de l'Eclairage, L*: lightness, a*, b*: chromaticity).

The resolution conversion section 42 scales up/down the input image data. For example, in case where the input image data is optically scaled up/down by the color image input apparatus 2, the resolution conversion section 42 scales up/down the input image data again so as to have a predetermined resolution (hereinafter referred to as a default resolution).

The MTF (modulation transfer function) process section 43 is used to cover (adjust) unevenness of spatial frequency characteristics among a plurality of color image input apparatuses 2. In the image signal outputted from a CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MTF deterioration causes the scanned image to blur.

Figures 5, 6:
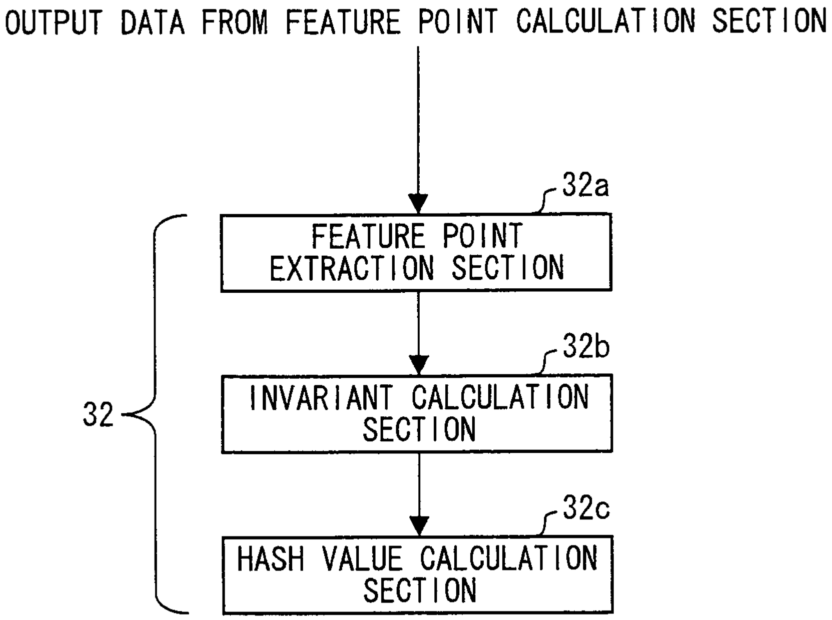
FIG. 5 is a block diagram schematically illustrating a document matching process section provided in the image data output processing apparatus illustrated in FIG. 2.
FIG. 6 is an explanatory drawing illustrating an example of filter coefficients for a mixing filter provided in an MTF process section of the image data output processing apparatus illustrated in FIG. 2.

The MTF process section 43 carries out an appropriate filtering process (emphasizing process) so as to recover the blur caused by the MTF deterioration. Further, the MTF process section 43 is used also to suppress a high frequency component that is unnecessary in a later-mentioned feature point extracting process in the subsequent centroid calculation section 45. That is, a mixing filter (not illustrated) is used to carry out an emphasizing process and a smoothing process. Note that, FIG. 6 illustrates an example of a filter coefficient of the mixing filter.

The binarization process section 44 compares the achromatized image data (a luminance value (luminance signal) or a lightness value (lightness signal)) with a predetermined threshold so as to binarize the image data.

The centroid calculation section 45 carries out labeling with respect to each pixel (labeling process) in accordance with the image data binarized by the binarization process section 44 (for example, the image data is represented by "1" and "0"). The centroid calculation section 45 specifies a connected region in which pixels each having the same label are connected to each other, extracts a centroid of the specified connected region as a feature point, and further, sends the feature point to the features calculation section 32. The feature point which is the centroid can be represented by coordinate value (X, Y) in the binarized image.

Figure 7:
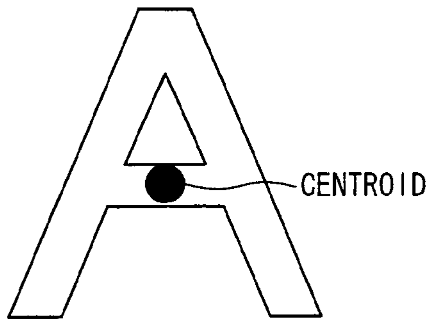
FIG. 7 is an explanatory drawing illustrating an example of a connected region extracted from input image data by the feature point calculation section of the image data output processing apparatus illustrated in FIG. 2, and a centroid thereof.
Figure 8:
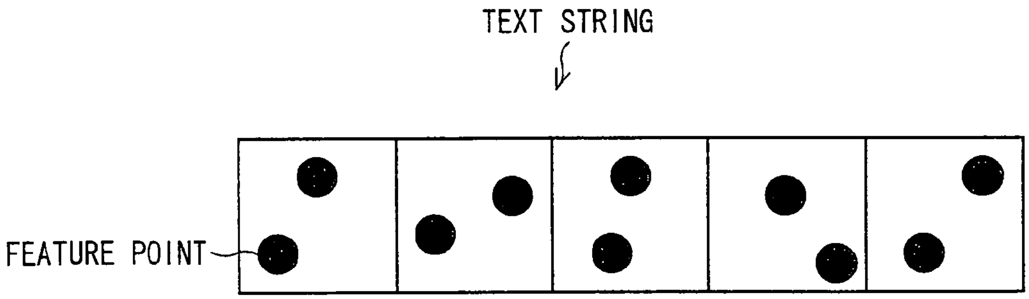
FIG. 8 is an explanatory drawing illustrating an example of each centroid (feature point) of a plurality of connected regions extracted from a text string included in input image data by the feature point calculation section of the image data output processing apparatus illustrated in FIG. 2.

FIG. 7 is an explanatory view illustrating an example of a connected region extracted from the input image data and a centroid of the connected region. FIG. 7 illustrates a connected region corresponding to a text string "A" and its centroid. FIG. 8 is an explanatory view illustrating an example of centroids (feature points) of plural connected regions extracted from text strings included in the input image data.

In FIG. 3 that is the block diagram schematically illustrating an arrangement of the document matching process section 14, the features calculation section 32 calculates features (hash value and/or invariant) which are invariable relative to geometric transformation such as rotation, parallel shift, scaling up, scaling down, and the like of a document image by use of a feature point calculated by the feature point calculation section 31.

FIG. 5 is a block diagram schematically illustrating an arrangement of the features calculation section 32. As illustrated in FIG. 5, the features calculation section 32 includes a feature point extraction section **32*a*, an invariant calculation section 32*b*, and a hash value calculation section 32*c***.

Figure 9:
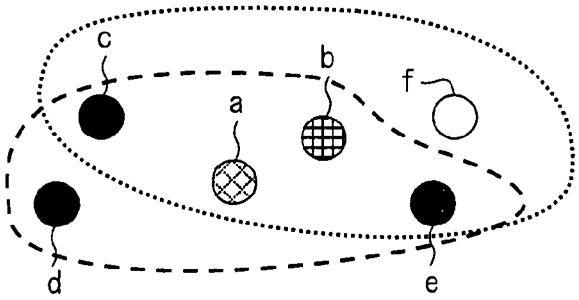
FIG. 9 is an explanatory drawing illustrating examples of a target feature point and peripheral feature points that are extracted at a time when a features calculation section of the image data output processing apparatus illustrated in FIG. 2 calculates features.

As illustrated in FIG. 9, the feature point extraction section **32*a* regards only one feature point as a target feature point and sequentially extracts peripheral feature points around the target feature point in such order that a feature point nearer to the target feature point is more preferentially extracted so as to extract a predetermined number of feature points (four feature points herein). In FIG. 9**, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 10:
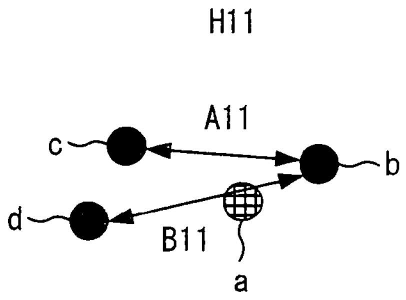
FIGS. 10(*a*) to 10(*d*) are explanatory drawings each illustrating an example of a combination of a target feature point and peripheral feature points that are extracted at a time when the features calculation section in the image data output processing apparatus illustrated in FIG. 2 calculates features.
Figure 10:
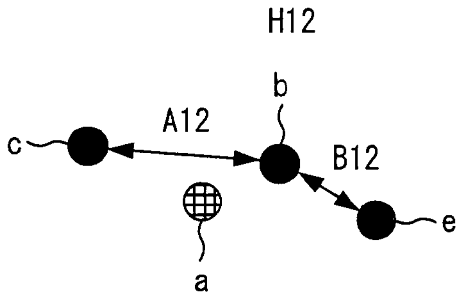
Figure 10:
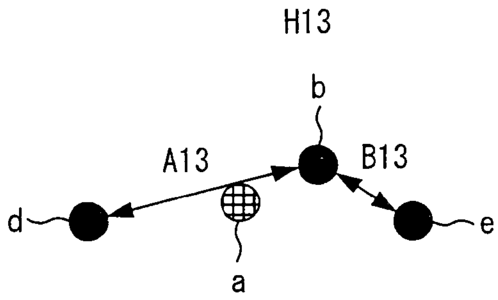
Figure 10:
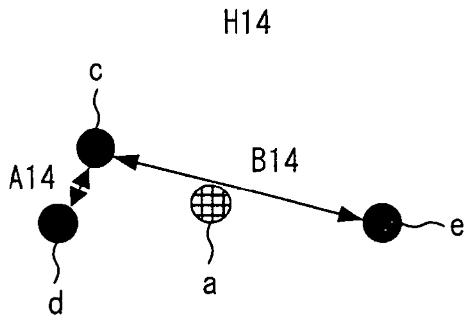

Further, the feature point extraction section **32*a* extracts a combination of three points which can be selected from the four peripheral feature points extracted in the foregoing manner. For example, as illustrated in FIGS. 10**(*a*) to 10(*d*), in case where the feature point a in FIG. 9 is regarded as a target feature point, a combination of three feature points out of b, c, d, and e, that is, a combination of peripheral feature points b, c, and d, a combination of peripheral feature points b, c, and e, a combination of peripheral feature points b, d, and e, and a combination of peripheral feature points c, d, and e are extracted.

Next, the invariant calculation section **32*b*** calculates an invariant (one of characteristic quantities) Hij of the extracted combination relative to geometrical transformation.

Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral characteristics is set as the invariant Hij.

The lengths of the lines are calculated in accordance with coordinates of the peripheral feature points. For example, in FIG. 10(*a*), when a length of a line connecting the feature point b and the feature point c is A11 and a length of a line connecting the feature point b and the feature point d is B11, the invariant H11 is such that H11=A11/B11.

Further, in FIG. 10(*b*), when a length of a line connecting the feature point b and the feature point c is A12 and a length of a line connecting the feature point b and the feature point e is B12, the invariant H12 is such that H12=A12/B12. Moreover, in FIG. 10(*c*), when a length of a line connecting the feature point b and the feature point d is A13 and a length of a line connecting the feature point b and the feature point e is B13, the invariant H13 is such that H13=A13/B13. Further, in FIG. 10(*d*), when a length of a line connecting the feature point c and the feature point d is A14 and a length of a line connecting the feature point c and the feature point e is B14, the invariant H14 is such that H14=A14/B14. In this manner, the invariants H11, H12, H13, and H14 are calculated in the examples illustrated in FIGS. 10(*a*) to 10(*d*).

Note that, in the foregoing examples, a line connecting a peripheral feature point first-nearest to the target feature point and a peripheral feature point second-nearest to the target feature point is indicated as Aij and a line connecting a peripheral feature point first-nearest to the target feature point and a peripheral feature point third-nearest to the target feature point is indicated as Bij, but the definition is not limited to this, and the lines used to calculate the invariant Hij may be set in any manner.

Next, the hash value calculation section 32*c* calculates a remainder of the following expression (2):

$$Hi=(Hi1\times10^3+Hi2\times10^2+Hi3\times10^1+Hi4\times10^0)/D \quad (2)$$

as a hash value (one of features) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that $n\geqq5$), or a value calculated in accordance with an arrangement of m points extracted from n points in the vicinity of the target feature point (m is such an integer that $m<n$ and $m\geqq5$) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, calculation of the hash value Hi is not limited to calculating a remainder of the expression (2) and regarding the remainder as the hash value Hi, and other hash function (for example, any one of hash functions mentioned in Patent Document 4) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

In FIG. 9, when extraction of peripheral feature points around a feature point a regarded as a target feature point and calculation of a hash value are completed, peripheral feature points around a feature point b regarded as a target feature point are extracted and a hash value is calculated. In FIG. 9, four feature points a, c, e, and f are extracted as peripheral feature points in case where the feature point b is regarded as a target feature point.

Figure 11:
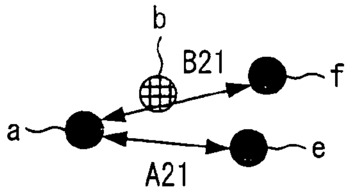
FIGS. 11(*a*) to 11(*d*) are explanatory drawings each illustrating an example of a combination of a target feature point and peripheral feature points that are extracted at a time when the features calculation section in the image data output processing apparatus illustrated in FIG. 2 calculates features.
Figure 11:
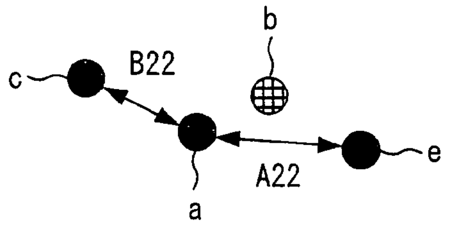
Figure 11:
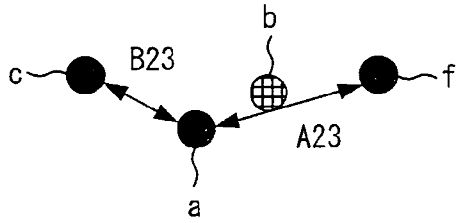
Figure 11:
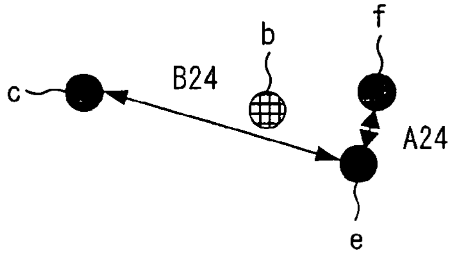

Further, as illustrated in FIGS. 11(*a*) to 11(*d*), a combination of three points (peripheral feature points a, e, and f, peripheral feature points a, e, and c, peripheral feature points a, f, and c, peripheral feature points e, f, and c) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

In a storage mode in which the input image data is stored as a reference image, the features calculation section 32 transmits the hash value (features) calculated in the foregoing manner and corresponding to each feature point of the input image data to the storage process section 36 illustrated in FIG. 3.

The storage process section 36 sequentially stores, to a hash table (not illustrated) provided in the memory 8, (i) a hash value calculated by the features calculation section 32 and corresponding to a respective feature point and (ii) an image index ID (ID1, ID2, . . . ) indicative of the reference image for identifying the reference image (see FIG. 12(*a*)). In a case where the hash value has already been stored, the image index is stored with the hash value respectively, so as to correspond to the hash value. The image index is serially assigned without any duplication.

Note that, in case where the number of images stored in the hash table is larger than a predetermined value (for example, 80% of the number of images which can be stored), old image index IDs may be searched and sequentially deleted. Further, the deleted image index IDs may be reused as image index IDs of new input image data.

Further, in case where the calculated hash values are identical with each other, these values may be collectively stored into the hash table, as illustrated in FIG. 12(*b*). Here, H1=H5, and H5 is integrated to H1.

Further, in the case where the reference document is duplex, the storage process section (duplex document management section) 36 stores, concurrently to storing the image index ID, a document index DocID and side information to the duplex document management table so as to correspond to a respective image index ID. The document index DocID and the side information are used for determining whether the image index ID is of a duplex document (see FIG. 14).

An identical document index DocID is set for each of the image index IDs of the images on a front and back side of a same reference document. The side information is set as "1" for the image on the front side of the reference document, and "2" for the image on the back side thereof. For example, in a case where the image reading apparatus 50 illustrated in FIG. 20 is set so that the reading section 54 reads a front side of a document and the image sensor section 53 reads a back side of the document, "1" is set for the image read out by the reading section 54, and "2" is set for the image read out by the image sensor section 53.

Figure 13:
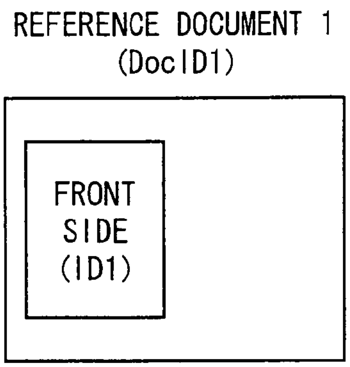
FIGS. 13(*a*) to 13(*c*) are explanatory drawings each illustrating relationship between a document index DocID of a reference document read in at a duplex document mode, and an image index ID of each document image included in the reference document on a front and back sides thereof.
Figure 13:
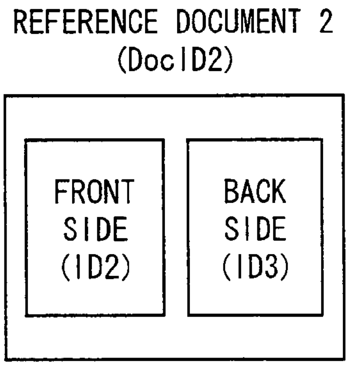
Figure 13:
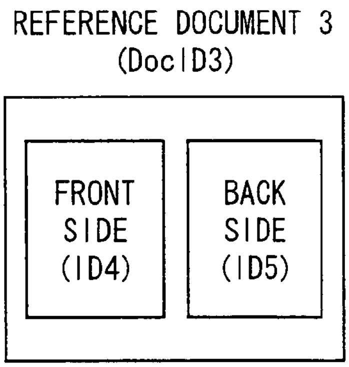

For example, as illustrated in FIG. 13(*a*), when just one side is stored, a reference document 1 is read in a one-side document mode. In such case, side information 1 and a document index DocID1 are stored with respect to the image index ID1 in the document management table, as illustrated in FIG. 14.

Figures 14, 15:
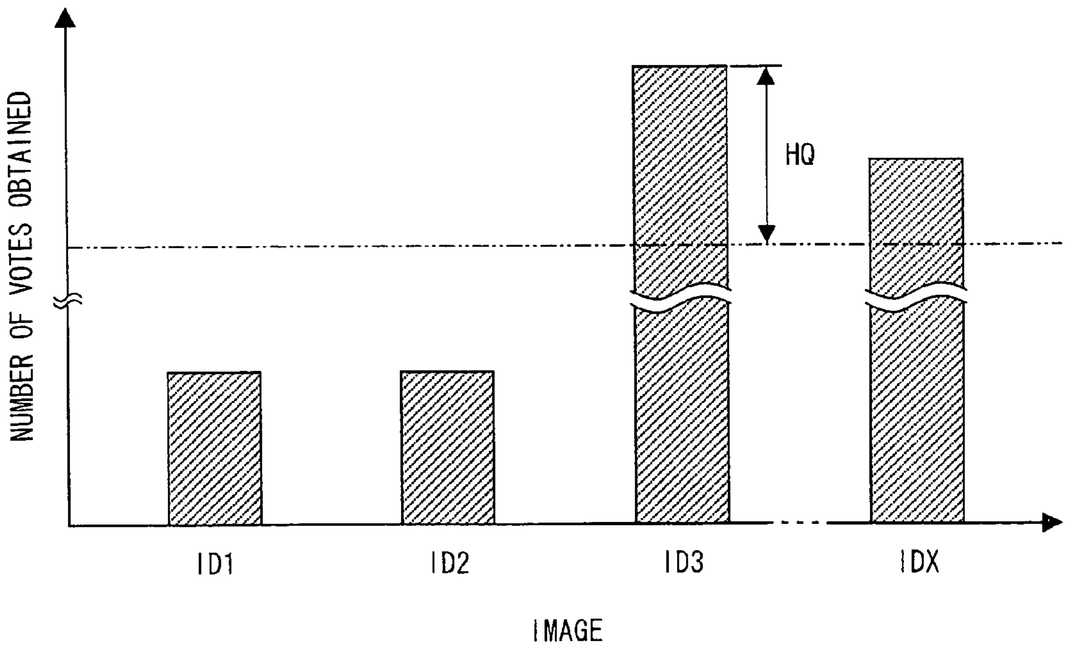
FIG. 14 is an explanatory drawing illustrating a duplex document management table in which the reference documents shown in FIGS. 13(*a*) to 13(*c*) is read out and stored.
FIG. 15 is a graph showing an example of the number of votes for each reference image in a voting process section in the image data output processing apparatus illustrated in FIG. 2.

Further, as illustrated in FIG. 13(*b*), in a case where a duplex reference document 2 is read in the duplex document mode, which duplex reference document 2 is indicated as a document index DocID2, which has an image index ID2 and an image index ID3 on a front side and a back side, respectively, the side information 1 and the document index DocID2 is stored with respect to the image index ID2, and side information 2 and the document index DocID2 is stored with respect to the image index ID3, each in the document management table as illustrated in FIG. 14.

Similarly, as illustrated in FIG. 13(*c*), in a case where the duplex reference document 2 is read in the duplex document mode, which duplex reference document 2 is indicated as a document index DocID3 that has an image index ID4 and an image index ID5 on the front side and the back side, respectively, the side information 1 and the document index DocID3 is stored with respect to the image index ID4, and the side information 2 and the document index DocID3 are stored with respect to the image index ID5, as illustrated in FIG. 14.

The voting process/candidate list creation section 33 compares the hash value calculated from the input image data of the matching document and corresponding to each feature point with the hash value stored in the hash table so as to vote for a reference image having the same hash value (see FIG. 15). FIG. 15 is a graph illustrating an example of a number of votes cast for each reference image indicated as image index IDs ID1, ID2, ID3, . . . , IDX.

For example, in the hash table as illustrated in FIG. 12(*a*), when a hash value H1 is calculated from the matching image, one vote is cast to the reference image indicated as the image index ID1, and when a hash value H3 is calculated from the matching image, one vote is cast for each of the reference images indicated as the image index ID1 and the image index ID2.

Further, in FIG. 12(*b*), H1 is equal to H5, and these hash values are collectively stored into the hash table as H1. Therefore, when the hash value H1 is calculated from the matching image, two votes are cast to the reference image indicated as the image index ID1.

In the present embodiment, for a duplex matching document, the voting process/candidate list creation section 33 creates a candidate list (see FIGS. 16(*a*) and 16(*b*)) at the point when the voting has completed.

When the duplex document mode is selected, for example, from the operation panel 6, the voting process/candidate list creation section 33 determines that the matching document is duplex. The duplex document mode has modes such as a mode that outputs the duplex document one side after another, or alternatively, a mode that outputs the duplex document by printing on both sides as similar to the duplex document.

Two candidate lists, one for a front side and one for a back side are created as the candidate lists. FIG. 16(*a*) illustrates contents of the front side candidate list. The back side candidate list is similar to this. Image index IDs, document index DocIDs, side information, and numbers of votes obtained are stored in the candidate lists, which candidate lists stores the image index ID which obtained the most amount of votes as the first candidate, and the image index IDs subsequent to the image index ID which obtained the most amount of votes as the second and latter candidates.

For example, in the example of FIG. 16(*a*), the first candidate that obtained the most number of votes is the reference image indicated as an image index ID4. This reference image is on a front side of a document indicated as a document index DocID3, and its number of votes obtained is N1. The second candidate is a reference image indicated as an image index ID10. This reference image is on a back side of a document indicated as a document index DocID7, and its number of votes obtained is N2.

Furthermore, in the example of FIG. 16(*a*), the first to third candidates are selected. A number of candidates to be selected depends on a vote result. As illustrated in FIG. 15, the second and latter candidates are to be selected from indices which are within a predetermined range HQ, which predetermined range HQ is a range of a difference in the number of votes obtained with respect to the first candidate which obtained the most number of votes (an image index ID3 in the example of FIG. 15).

In the present embodiment, the indices that have a difference in the number of votes within 80% with respect to the first candidate which obtained the most number of votes are set as the second candidate, the third candidate . . . , in an order of the indices having a smaller difference, so that the reference image corresponding to the matching image is not left out from the candidate list.

FIG. 16(*b*) illustrates contents of the back side candidate list created corresponding to the front side candidate list illustrated in FIG. 16(*a*). In the example of the back side candidate list illustrated in FIG. 16(*b*), the first candidate which obtained the most number of votes is a reference image indicated as an image index ID5. This reference image is on a back side of a document indicated as the document index DocID3, and a number of votes obtained is n1. Furthermore, in the example of FIG. 16(*b*), there is no second candidate, since there are no indices that have a difference in the number of votes obtained with respect to the first candidate within a predetermined range.

In the front side candidate list and the back side candidate list, when there are no candidates including the first candidate, an image index ID0, a document index DocID0, each of which indicate that there are no candidates, and the side information, are stored in the candidate list. As to the side information, "1" which indicates a front side is stored in the front side candidate list, and "2" which indicates a back side is stored in the back side candidate list.

The similarity determination process section (determination process section) 34 reads out a vote result of the voting process section 33 (an image index ID of each reference image and the number of votes for each reference image) from the memory 8, and extracts the maximum number of votes obtained and an image index ID of a reference image with the maximum number of votes obtained.

Further, the similarity determination process section 34 compares the maximum number of votes obtained with a predetermined threshold value TH so as to determine whether there is any similarity or not (whether the input image data is identical with image data of the reference image or not). That is, in case where the maximum number of votes obtained is not less than the predetermined threshold value TH, it is determined that "there is a similarity", and in case where the maximum number of votes is less than the threshold value TH, it is determined that "there is no similarity".

The similarity determination process section 34 then sends a determination signal indicative of the determination result to the control section 7. In the case where there is a similarity, the control section 7 supplies a control signal to control an output process, for example, prohibiting an output process (an image forming process in the color copying machine) with respect to the image data of the input document, or degrading an image quality.

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value TH (80% of the number of total votes for example) to determine the similarity.

That is, in case where the calculated similarity is not less than a threshold value TH, it is determined that “there is a similarity”, and in case where the calculated similarity is less than the threshold value TH, it is determined that “there is no similarity”. Note that, in this case, the total number of hash values extracted from the input image data may be larger than the maximum number of times of storing a hash value (particularly, a case where the matching document and/or the image of the reference document partially has a handwritten part), so that the calculated value of the similarity may exceed 100%.

Further, the threshold value TH in determining the similarity may be constant for each reference document or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper current or the like. In this manner, the importance may be set by stages according to each reference image.

In this case, a weighting coefficient according to importance of a reference image is stored in the memory 8 with the weighting coefficient corresponding to an image index ID of the reference image, and the similarity determination process section 34 determines the similarity by using the threshold value TH corresponding to the reference image with the maximum number of votes obtained.

Further, it may be so arranged that: in determining the similarity, the threshold value TH is made constant and the number of votes obtained for each reference image (the number of votes obtained for each reference image) is multiplied by a weighting coefficient of each reference image so as to determine the similarity.

In this case, the weighting coefficient according to the importance of each reference image is stored in the memory 8 with the weighting coefficient corresponding to an image index ID of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes.

For example, a maximum corrected number of obtained votes may be compared with the threshold value TH, or a value obtained by normalizing the maximum corrected number of obtained votes by the number of total votes may be compared with the threshold value TH, or a value obtained by normalizing the maximum corrected number of obtained votes by the maximum number of times of storage may be compared with the threshold value TH. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

In the case where the matching document is duplex, the matching result correction process section 35 corrects a matching result (determination result) made by the similarity determination process section 34, with reference to the front side candidate list and the back side candidate list created at the voting process/candidate list creation section 33.

The matching result correction process section 35 determines whether the document index DocID of the first candidates in the candidate lists is identical. If they are identical, the determination result of the similarity determination process section 34 is deemed correct, and no correction is made. That is to say, when the document index DocID of the first candidates in the candidate lists are identical, the document images on the front side and the back side of the matching document are each determined as similar to the reference documents of the first candidates on the candidate lists.

On the other hand, if the document index DocID of the first candidates on the candidate lists is not identical, the matching result correction process section 35 tries to process a correction of the matching result with reference to the front and back side candidate lists, regarding that there may be a mistake in the determination result made by the similarity determination process section 34.

In the correction process, a reference image that has a higher similarity among the reference images that are the first candidates in the front and back side candidate lists is determined as a candidate document. It is determined whether or not a reference image corresponding to an identical document index DocID as the candidate document is included in the candidate list which includes the first candidate reference image having a lower similarity. If the reference image corresponding to the identical document index DocID is included in the candidate list which includes the first candidate reference image having the lower similarity, the image index ID of the first candidate reference image having the lower similarity in the matching result is corrected to the image index ID of the reference image corresponding to the identical document index DocID as the candidate document. That is to say, in a case where the front and back side candidate lists include reference images that correspond to the identical document index DocID, even if one of them is not the first candidate and is a candidate having a lower order than the first candidate, an attribute that the image is included in the same reference document is prioritized, and is determined that the document images on the front side and back side of the matching document is similar to reference images in the candidate lists having the identical document index DocID.

Figure 1:
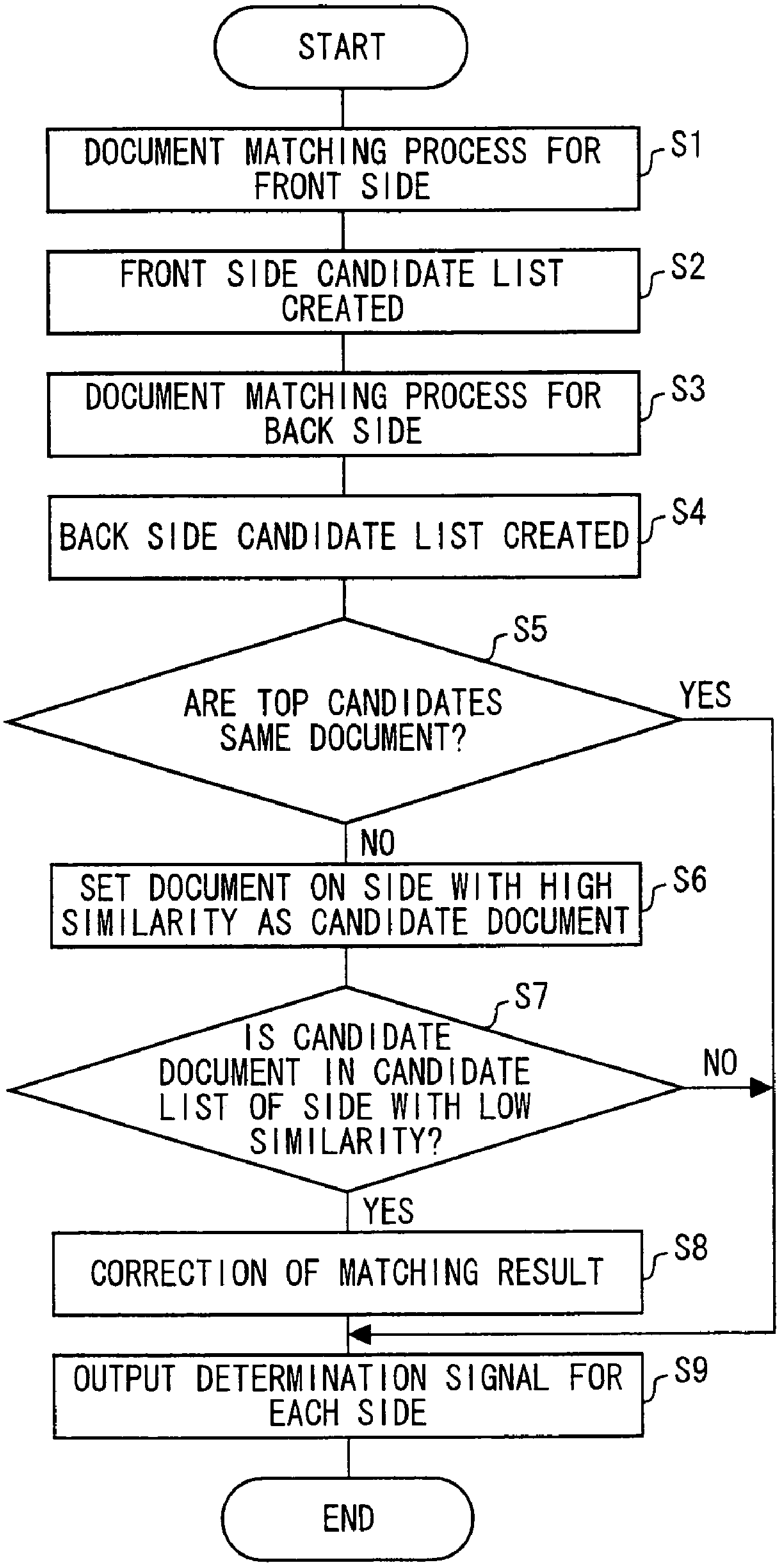
FIG. 1 is a flow chart illustrating procedures of each processes in a voting process/candidate list creation section, a similarity determination process section, and a matching result correction process section, each in a document matching process section provided in an image data output processing apparatus as a digital color copying machine according to one embodiment of the present invention.

The following description explains each processes carried out by the voting process/candidate list creation section 33, the similarity determination process section 34, and the matching result correction process section 35, in the case where the matching document is duplex, with reference to a flow chart illustrated in FIG. 1.

When a document to be read out is duplex, a duplex document mode is selected from the operation panel 6. Accordingly, the control section 7 determines that a matching document is duplex in response to this mode selection. Subsequently, the control section 7 causes the voting process/candidate list creation section 33 to create the candidate lists, and the matching result correction process section 35 to process a matching result correction depending on a result of the similarity determination process.

The voting process/candidate list creation section 33 carries out a voting process (document matching process) with respect to image data on a front side of the duplex document read out (S1). Subsequently, a front side candidate list is created based on a vote result (S2). Meanwhile, the similarity determination process section 34 determines that a first candidate in the front side candidate list is similar to a document image on the front side of the matching document.

Following this, the voting process/candidate list creation section 33 carries out the voting process (document matching process) with respect to image data on a back side of the duplex document read out (S3). Subsequently, based on a vote result, a back side candidate list is created (S4). Meanwhile, the similarity determination process section 34 determines, as similar to the front side candidate list, that a first candidate in the back side candidate list is similar to a document image on the back side of the matching document.

Next, the matching result correction process section 35 determines whether or not a document index DocID of the first candidates in the candidate lists are identical, and whether or not side information of the first candidates in the candidate list are different to each other, with reference to the front and back side candidate lists (S5).

For example, assume that the front and back side candidate lists created in S2 and S4 have contents as illustrated in FIGS. 16(*a*) and 16(*b*). In this case, the first candidates in the front and back side candidate lists match as having the document index DocID3 while their side information is different to each other. Therefore, it is determined as YES in S5. This causes to skip procedures S6 through S8 which are steps for correcting a matching result, and subsequently proceeds to S9, which is a step for outputting a determination signal with respect to the sides.

FIG. 17 illustrates a matching result in the case where the front and back side candidate lists have the contents as illustrated in FIGS. 16(*a*) and 16(*b*). The document image on the front side of the matching document is determined as similar to the reference image that is indicated as the image index ID4, and the document image on the back side of the matching document is determined similar to the reference image that is indicated as the image index ID5. Therefore, there is no need to make any corrections.

On the other hand, for example, if the front and back side candidate lists created in S2 and S4 have contents as illustrated in FIGS. 18(*a*) and 18(*b*), the document index DocID of the first candidate in the front side candidate list and the document index DocID of the first candidate in the back side candidate list do not match. As a result, it is determined as NO in S5, thereby causing the matching result correction to be processed.

In the matching result correction process, the document index DocID of the candidate having a higher similarity is set as an index DocID of a candidate document (S6).

After the candidate document is set in S6, it is determined whether or not an image corresponding to an identical document index DocID to the set candidate document and a different side information to the candidate document is included in the other candidate list which includes the first candidate that is determined as having a lower similarity (S7). Subsequently, in the case where it is determined as YES in S7, the process proceeds to S8, the step in which the matching result is corrected.

For example, assume that the front and back side candidate lists have the contents as illustrated in FIGS. 18(*a*) and 18(*b*), respectively. In this case, ratios (ratio of votes obtained) are calculated, of (i) the number of votes obtained N1 of the first candidate in the front side candidate list to a total number of votes in the matching process with respect to the front side of a matching document and (ii) the number of obtained votes n1 of the first candidate in the back side candidate list to a total number of votes in the matching process with respect to the back side of the matching document. The ratios that are calculated are indicative of a similarity. Subsequently, the first candidate having a higher similarity is selected as the candidate document.

Here, for example, in a case where the first candidate in the front side candidate list as illustrated in FIG. 18(*a*) is determined to have the higher similarity than the first candidate in the back side candidate list, the candidate document is set as the document index DocID10 in S6. Subsequently in S7, it is found whether or not a candidate that corresponds to the document index DocID10 is included in the back side candidate list as illustrated in FIG. 18(*b*). In this case, the back side candidate list includes the document index DocID10, and also has a different side information. As a result, the matching result is corrected based on information of the document index DocID10.

FIG. 19 illustrates an initial matching result in the case where the front and back side candidate lists have the contents as illustrated in FIGS. 18(*a*) and 18(*b*), respectively, and their corrected matching results. The matching result which has not been subjected to the correction is based on a determination result made by the similarity determination process section 34. Therefore, the document image on the front side of the matching document is determined as similar to a reference image having an image index ID15 which is the first candidate on the front side candidate list, and the document image on the back side of the matching document is determined as similar to the reference image corresponding to an image index ID21 which is the first candidate on the back side candidate list.

As a result of the correction, the document image on the front side of the matching document is determined as similar to the reference image corresponding to the image index ID15, and the document image on the back side of the matching document is determined as similar to a reference image corresponding to an image index ID14. The image index IDs 14 and 15 are respective image index IDs of the reference images on the front and back sides of a reference document indicated as the document index DocID10.

In a case where it is determined NO in S7 in the flow chart illustrated in FIG. 1, the process proceeds to S9. In S9, a determination signal with respect to each side is outputted without any corrections made to the matching result.

As described above, with the digital color copying machine 1 of the present embodiment, in the case where the reference document is a duplex document, the storage process section 36 stores, in the storage section, a document index DocID for identifying the duplex document which includes the reference images, so as to correspond to an image index ID for identifying the document images on the front and back sides of the document. This allows unique specification of a duplex document which includes the document images on the front and back side of the duplex document.

However, such storage process section 36 is not essential, and may be separated from the digital color copying machine 1 which is the image data output processing apparatus. The form of the storage process section 36 may be a storage medium that is storage processed outside the copying machine 1, which storage medium is installed in the digital color copying machine 1 so as to be accessed. Alternatively, the storage medium may be accessed via communications means such as a network.

In matching the images, the voting process/candidate list creation section 33, in the case where the matching document is duplex, extracts, from a duplex document management table, for each of the images on the front side and the back side of the duplex document, (i) an image index of the reference image having a similarity not less than a predetermined value and (ii) a document index corresponding to the image index, so as to create the front side and back side candidate lists.

The similarity determination process section 34 and the matching result correction process section 35 determines, in a case where each of the front and back side candidate lists created include a reference image index that corresponds to an identical reference document index, that the images on the duplex document inputted in the matching mode are similar to the reference images in the candidate lists that correspond to the identical document index, respectively.

Thus, in the case where the reference document is duplex, an attribute indicative of a duplex document is included in one of the elements in determining the similarity with the reference document, and in the case where the matching document is duplex, determination of the reference document by including the attribute that the matching document is duplex is possible.

As a result, determination accuracy is improved in the case where the matching document is duplex and is similar to (matches) the reference document, while avoiding mistaken determination such as determining an image on one side of the matching document as similar to an image on one side of the reference document whereas an image on the other side of the matching document is determined as different to an image on the other side of the reference document.

Furthermore, in the present embodiment, the similarity determination process section 34 determines whether the images of the input image data are similar to the reference images. In a case where the images are similar, the similarity determination process section 34 determines that a reference image which has a highest similarity with respect to the image is the image of the input image data. Subsequently, the matching result correction process section 35 determines whether or not first candidate reference images, having a highest similarity in the front and back side candidate lists, correspond to an identical document index which indicate a same reference document. If the first candidate reference images correspond to the identical document index, the determination result made by the similarity determination process section 34 is not corrected. If the first candidate reference images do not correspond to the identical document index, similarities of the first candidate reference images in the front and back side candidate lists, respectively, are compared, so as to regard a reference document corresponding to one of the first candidate reference images having a higher similarity as a candidate document. Subsequently, it is determined whether or not a reference image, corresponding to a reference document index of the candidate document, is included in the candidate list of the other of the first candidate reference images having a lower similarity. If such an image is included, the determination result made by the similarity determination process section 34 with respect to the other of the first candidate reference images having the lower similarity is corrected so that the reference image, corresponding to the reference document index of the candidate document, is the image of the other of the first candidate reference images having the lower similarity.

That is to say, in the case where the first candidates in the front and back side candidate lists correspond to a different reference document index, that is, when the reference images of the first candidates in the front and back side candidate lists are not in a relation of a front and back sides of a same document, the matching result correction process section 35 corrects the determination result of the similarity determination process section 34 to a combination which satisfies the relation of the reference images to be on the front and back sides of the same document.

Therefore, even if many images are listed up in the front and back side candidate lists, reliable and short-process determination of similar images to the reference images on a same reference document is possible, in an order of high degree in similarity.

Further, in the present embodiment, side information indicating whether the reference image is on the front side or the back side of the reference document is stored in the duplex document management table so as to correspond to the image index. The voting process/candidate list creation section 33 creates the candidate lists including the side information. In a case where the front and back side candidate lists include reference images having (i) an identical reference document index and (ii) side information different to each other, the matching result correction process section 35 determines that the images of the duplex document inputted in the matching mode and the reference images corresponding to the identical reference document index are similar to each other.

As such, further highly accurate determination is possible by including the side information as a determination value, even in a situation where determination cannot be made just by the index of the reference document, for example, in a case where the front and back side candidate lists include a same reference image, since the images on the front and back sides of the matching document are similar to each other. Use of the side information allows distinguishing of the images in such situation.

Figure 21:
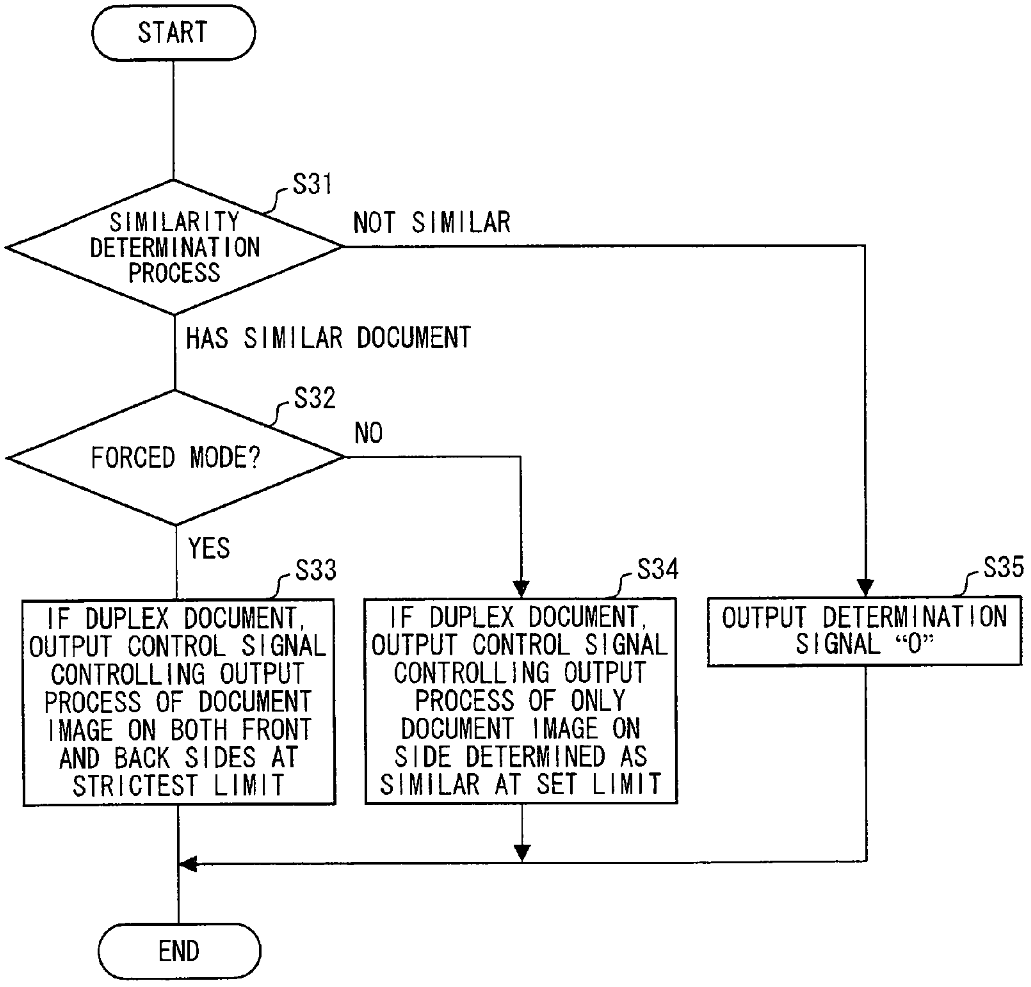
FIG. 21 is a flow chart illustrating procedures of an output process control process in a document matching process section provided in the image data output processing apparatus illustrated in FIG. 2.

Further is an explanation explaining procedures for regulating an output process after the similarity determining process is carried out in the digital color copying machine 1 of the present embodiment, with reference to a flow chart in FIG. 21.

In the control section 7, if both the front and back sides of the matching document are determined as not similar to a reference image in the similarity determination process in S31, the process proceeds to S35. Subsequently, the control section 7 outputs a determination signal “0” as a control signal which permits the output process of the matching document as it is read out.

On the other hand, when the images on the matching document are determined as similar in S31, it is determined whether or not a forced mode is set (S32). If the forced mode is set, a limit set to the reference image that is determined as similar is applied to the document images on both the front and back sides of the matching document. If the limit is different between the images on the front and back sides, the control section 7 causes a control signal which controls the output process in a highest priority to be outputted (S33).

On the other hand, if the forced mode is not set, the process proceeds to S34. The control section 7 causes a control signal to be outputted which control signal regulates the output process of the document image on the side which has been determined as similar to the reference image, among the document images on the front and back sides of the matching document included in the matching document.

Figure 22:
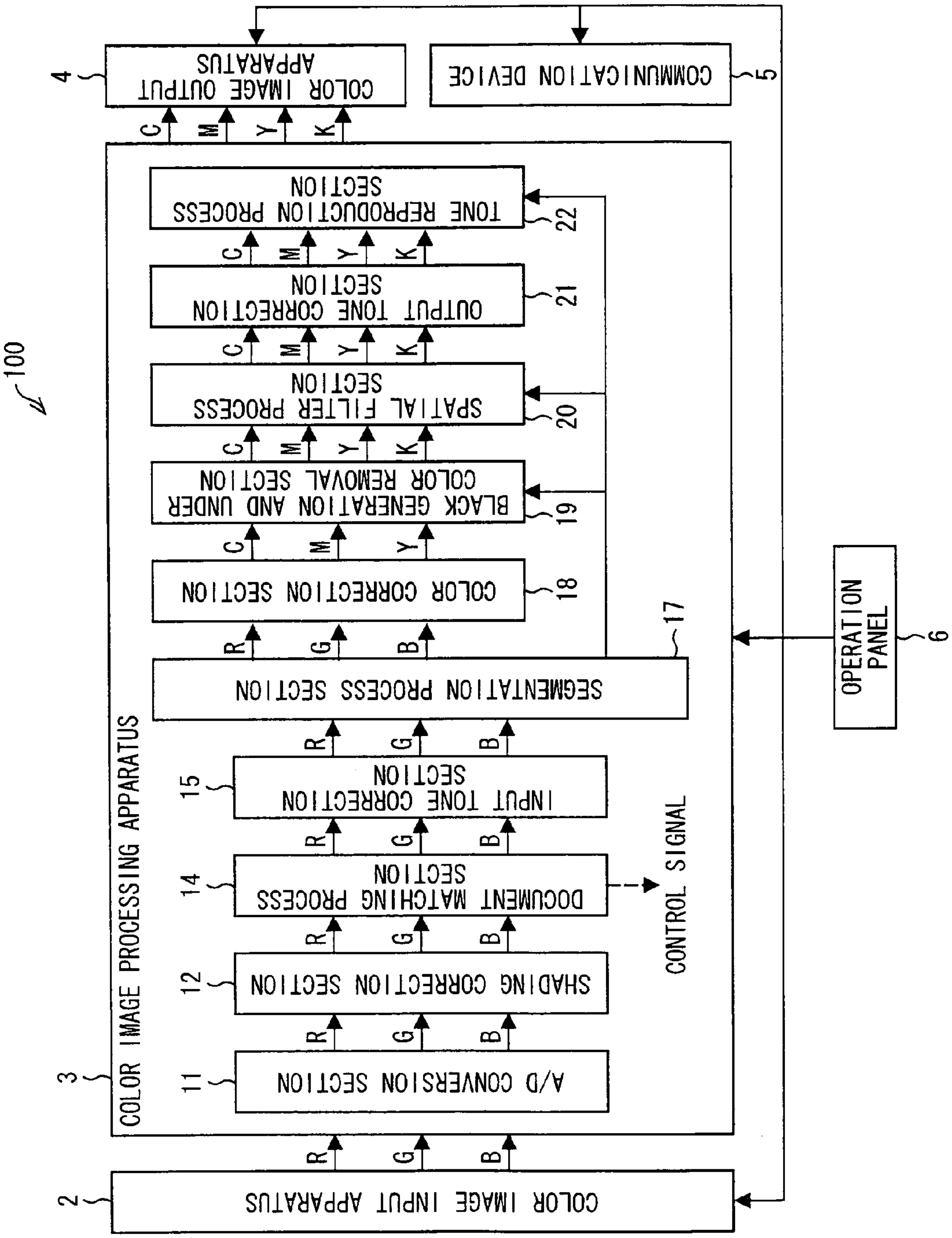
FIG. 22 is a block diagram schematically illustrating an arrangement of an image data output processing apparatus as a digital color multi-function printer according to another embodiment of the present invention.

Further, although this embodiment deals with a case where the present invention is applied to the digital color copying machine 1, the target apparatus to which the present invention is applied is not limited to the above apparatus, and may be, for example, a digital color multi-function printer (MFP) 100, as illustrated in FIG. 22. The digital color multi-function printer 100 has functions such as a copying function, a printer function, a facsimile function, a scanner function, and a scan to e-mail function.

In FIG. 22, members having the same functions as those in the digital color copying machine 1 have the same referential numerals, and are not described here.

Here, a communication device 5 is constituted by, for example, a modem and a network card. The communication device 5 performs a data communication with other devices connected to a network (e.g., a personal computer, a server, other digital multi-function printer, a facsimile device) via a network card, a LAN cable, or the like.

In transmitting image data, the communication device 5 (i) ensures a transmittable state by carrying out a transmission procedure with a destination device, (ii) reads out image data compressed in a predetermined format (image data scanned by a scanner) from a memory, (iii) carries out necessary processes such as a conversion of a compression format with respect to the image data, and (iv) sequentially transmits the image data to the destination device via a communication line.

Further, in receiving image data, while carrying out a communication procedure, the communication device 5 receives image data transmitted from an originating communication device, and sends the image data to a color image processing apparatus 3. The image data received by the color image processing apparatus 3 is subjected to predetermined processes such as a decompression process, a rotating process, a resolution conversion process, an output tone correction, and a tone reproduction process. The image data processed is outputted by a color image output apparatus 4. Further, it may be so arranged that the received image data is stored in a storage device (not illustrated), and the color image processing apparatus 3 reads out the image data as required and carries out the predetermined processes with respect to the image data.

In the digital color multi-function printer 100, a user can input, from an operation panel 6, a processing request (e.g., a processing mode (copy, printing, transmission, editing and the like), the number of images to be processed (the number of images to be copied, the number of images to be printed out), a destination of input image data, and the like) with respect to the input image data. In a case where it is determined that there is a similarity, a control section 7 controls a document matching process section 14 in regard to not only a copying process, but also output processes such as printing, transmission, editing and the like.

For example, in a case where a facsimile transmission mode is selected, when the document matching process section 14 determines prohibition of an output of input image data, the image data stored in a memory is deleted and a facsimile transmission of the image data is not carried out. Alternatively, in a case where, even though the input image data is identical with a reference image, a facsimile transmission of the image data is permitted (an image index ID indicative of the reference image and a destination of the image data are stored in advance so as to be related to each other), the image data may be transmitted by referring to information of the destination.

Figure 23:
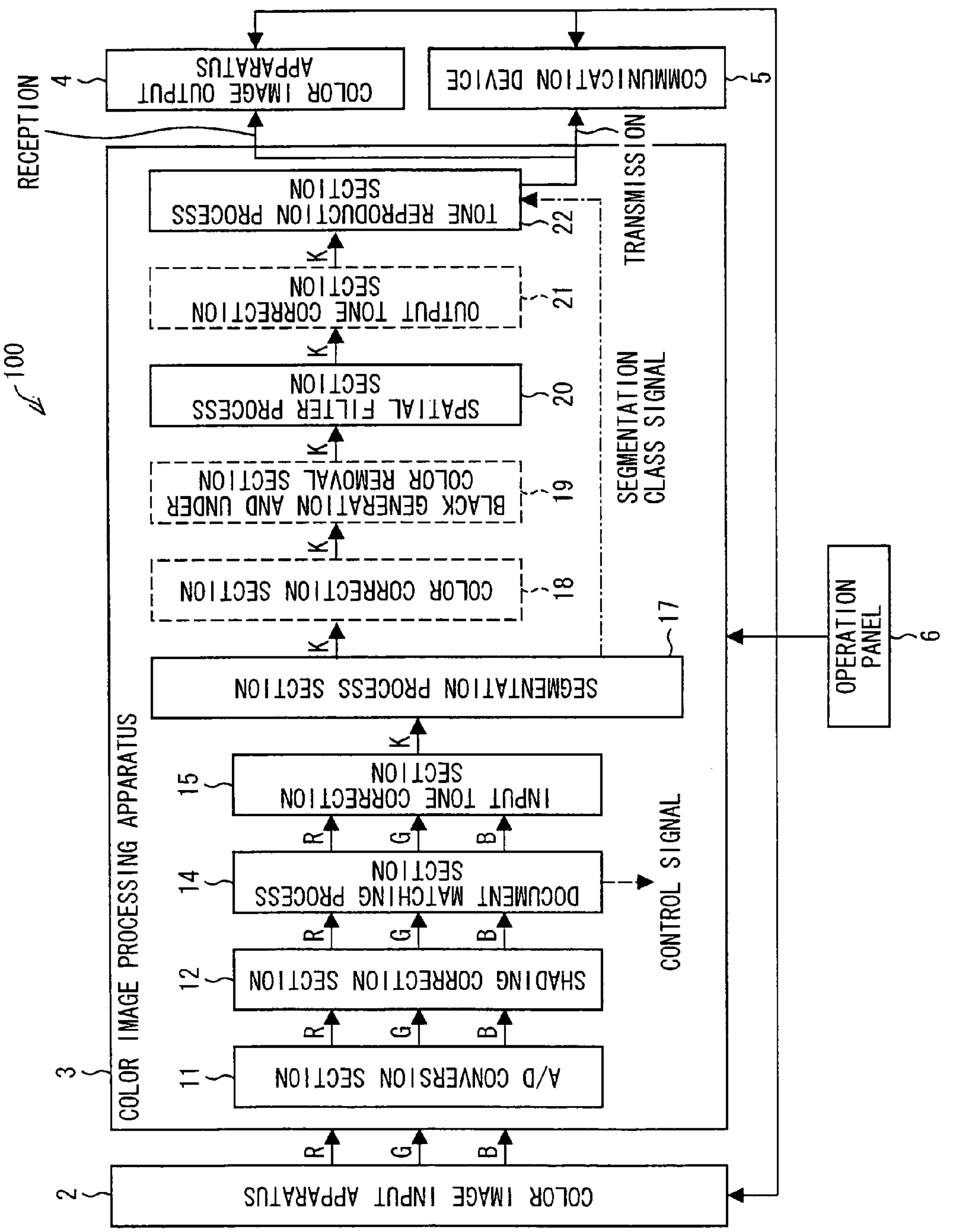
FIG. 23 is an explanatory drawing illustrating a flow of image data in a facsimile process in the image data output processing apparatus in FIG. 22.

A facsimile process in the digital color multi-function printer 100 is explained with reference to FIG. 23. In FIG. 23, process sections that do not carry out a process are illustrated in dot lines. In this embodiment, a segmentation process section 17 is used in the facsimile process. However, the segmentation process section 17 is not necessarily required in the facsimile process. Further, in facsimile transmission, a resolution conversation section and a compression/decompression process section carry out each process after a tone reproduction process section 22.

In transmission of input image data, for example, 8-bit input image data loaded by a color image input apparatus 2 is subjected to each of the aforementioned processes in a color image processing apparatus 3, and RGB signals of the input image data that is processed are converted into a luminance signal (a K signal in FIG. 23), for example, by a matrix calculation or the like, in an input tone correction section 15. The image data converted into the format of the luminance signal is then subjected to predetermined processes in a segmentation process section 17 and a spatial filter process section 20, and binarized, for example, by an error diffusion process in a tone reproduction section 22. The image data that is binarized is then subjected to a rotating process as needed, compressed into a predetermined format in the compression/decompression process section, and stored in a memory (not illustrated).

When a communication device (e.g., a modem) 5 carries out a communication procedure with a destination device so as to ensure a transmittable state, the image data compressed in the predetermined format is read out from the memory, subjected to necessary processes such as a conversion of the compression format, and sequentially transmitted to the destination device via a communication line.

On the other hand, in reception of image data, when an image is transmitted from an originating communication device via a communication line, while carrying out the communication procedure, a control section receives the image transmitted from the counter device. The received image data compressed in a predetermined format is sent to the color image processing apparatus 3.

The compression/decompression process section decompresses the image data received in the color image processing apparatus 3 so that the document image received as a page image is reproduced. The reproduced document image is then subjected to a rotating process depending on a capability of a color image output apparatus 4 and is then subjected to a resolution conversion process in a resolution conversion section. The image data reproduced as an image per page is outputted from the color image output apparatus 4.

The above explanation deals with a case of processing monochrome image data as an example, but the present invention is not limited to this. For example, image data may be also processed by use of a color image processing apparatus 3 that includes, between the segmentation process section 17 and the spatial filter process section 20, (i) a color correction section 18 that carries out, with respect to RGB signals loaded by the color image input apparatus 2, a process of removing color impurity on the basis of spectral characteristics of CMY (C: Cyan, M: Magenta, and Y: Yellow) color materials of toner or ink that include an useless absorption component, in order to realize a faithful color reproduction, and (ii) a black generation and under color removal section 19 that carries out (a) a black generation process for generating a black (K) signal from three color (CMY) signals after the color correction process and (b) a generation process of new CMY signals by removing the K signal obtained by the black generation process from the original CMY signals.

In the arrangement of FIG. 22, a similarity determination process is carried out in a document matching process section

14 provided in the digital color multi-function printer 100. However, the present invention is not limited to this. For example, a part of or all functions that the control section 7 and the document matching process section 14 have may be carried out in an external apparatus, which is connected to the digital color multi-function printer 100 so that the external apparatus be communicated with the digital color multi-function printer 100.

Furthermore, the present invention may be applied, for example, to a monochrome multi-function machine. Further, the present invention may be applied not only to multi-function machines, but also to a facsimile communication apparatus, a copying machine, an image readout apparatus, and the like.

Figure 24:
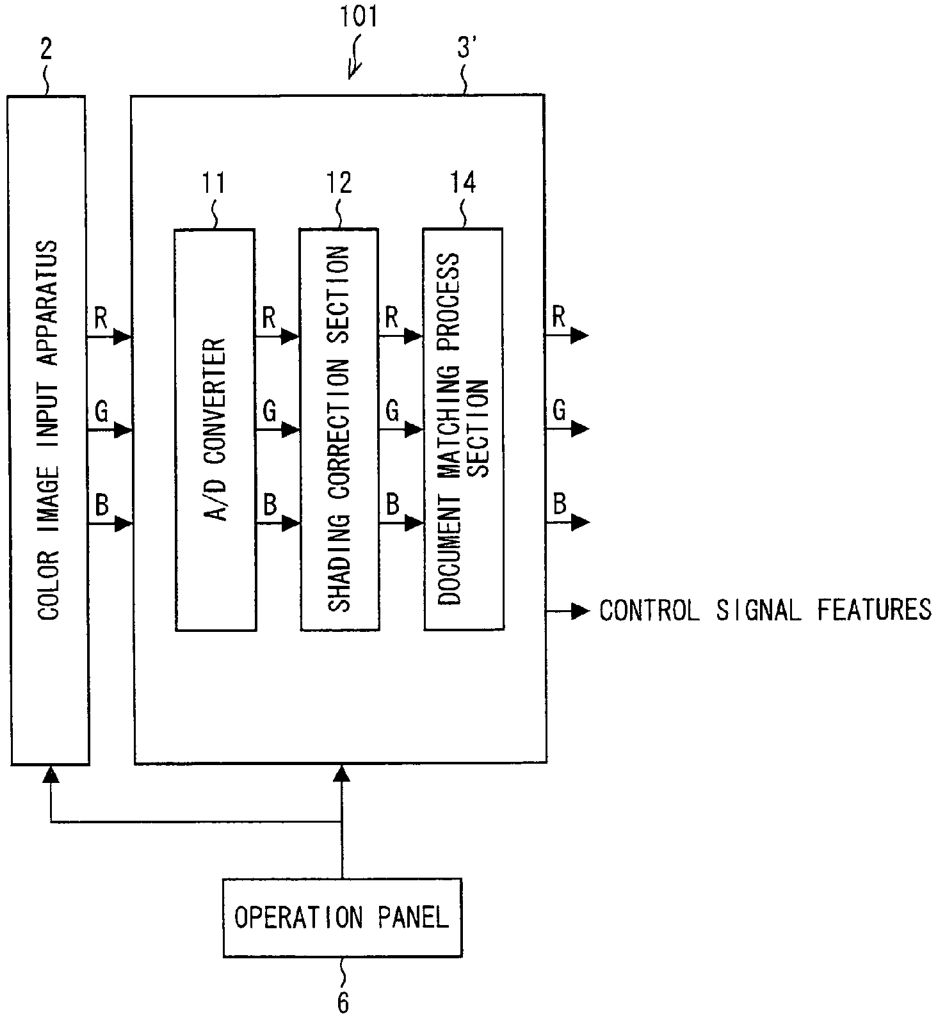
FIG. 24 is a block diagram schematically illustrating an arrangement of an image data output processing apparatus according to further another embodiment of the present invention.
Figure 25:
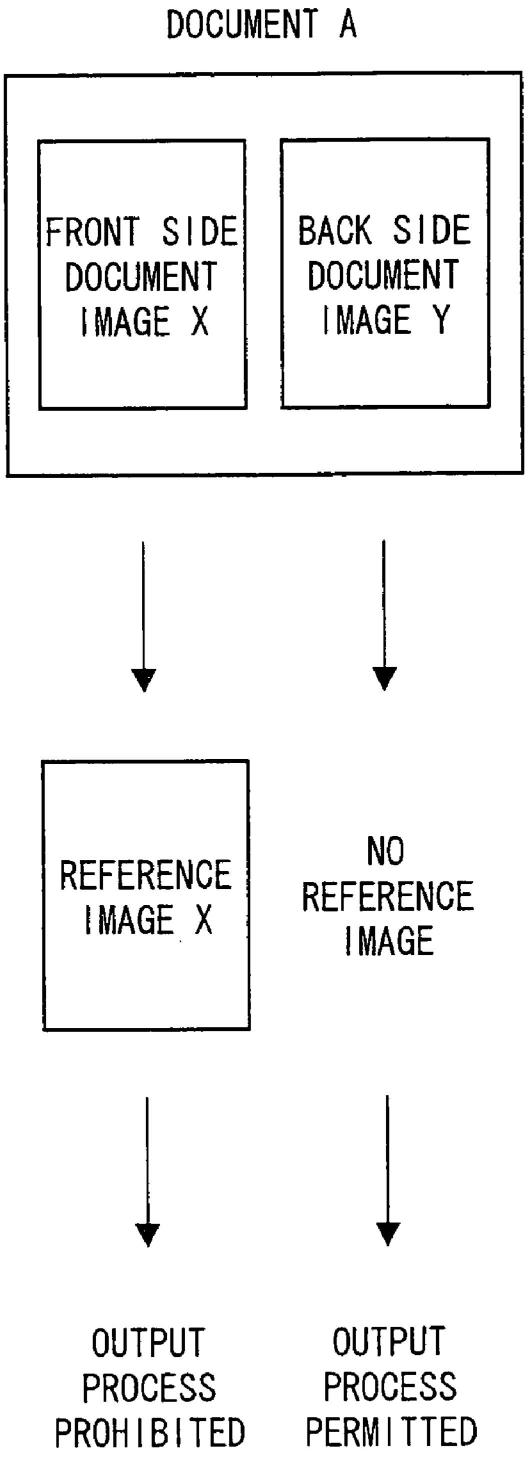
FIG. 25 is an explanatory view illustrating a problem in a conventional image data output processing apparatus.

For example, FIG. 24 is a block diagram illustrating an exemplary arrangement of a flat bed scanner 101 to which the present invention is applied.

As illustrated in FIG. 24, the flat bed scanner 101 includes a color image input apparatus 2 and a color image processing apparatus 3'. The color image processing apparatus 3' includes an A/D conversion section 11, a shading correction section 12, a document matching process section 14, a control section 7 (not illustrated in FIG. 24), and a memory 8 (not illustrated in FIG. 24). The color image input apparatus 2 is connected to the color image processing apparatus 3', and the color image input apparatus 2 and the color image processing apparatus 3' constitute the image data output processing apparatus as a whole. Functions of the A/D conversion section 11, the shading correction section 12, the document matching process section 13, the control section 7, and the memory 8 in the color image processing apparatus 3' are substantially the same as those of the members in the digital color copying machine 1 as described above and therefore explanations thereof are omitted here.

Each section (each block) constituting the document matching process section 14 and the control section 7 included in the digital color copying machine 1, the multi-function printer 100, or the flat bed scanner 101 may be realized by software by using a processor such as a CPU. Namely, the digital color multi-function printer 1, the multi-function printer 100 or the flat bed scanner 101 include: a CPU (central processing unit) for executing a program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color copying machine 1, the multi-function printer 100 or the flat bed scanner 101 are provided with a computer-readable storage medium for storing program codes (such as executable program, intermediate code program, and source program) of programs of the digital color copying machine 1, the multi-function printer 100 and/or the flat bed scanner 101 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color copying machine 1, the multi-function printer 100 or the flat bed scanner 101 may be arranged so as to be connectable to a communication network so that the program code is supplied to the digital color copying machine 1, the multi-function printer 100 or the flat bed scanner 101 via the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11 wireless, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color copying machine 1, multi-function printer 100 or the flat bed scanner 101 is not limited to being realized by software, and may also be realized by hardware logic. Each block of the digital color copying machine 1, multi-function printer 100 or the flat bed scanner 101 may be a combination of hardware carrying out some of the processes and the computing means controlling the hardware and executing program code for the other processes.

The computer system of the present invention may include: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means to be connected with a server etc. via a network.

The present invention is not limited to the description of the embodiments above, but may be altered by a skilled person within the scope of the claims. An embodiment based on a proper combination of technical means disclosed in different embodiments is encompassed in the technical scope of the present invention.

As described above, an image data output processing apparatus of the present invention carries out an output process with respect to input image data, the image data output processing apparatus including: an image matching section that (i) extracts features of an image of the input image data and (ii) carries out a determination as to a similarity between the image of the input image data and an image of a reference document based on a comparison made between the features extracted and features of the image of the reference document stored in advance; and an output process control section that controls the output process with respect to the input image data based on a determination result made by the image matching section, wherein the image matching section carries out a matching of the image of the input image data by use of a storage section which stores (i) features of each of images on a front side and a back side of a duplex reference document and (ii) an index for identifying a duplex document including the reference image, the index being stored so as to correspond to an index for identifying each of the images on the front side and the back side of the duplex document, the image matching section further including: a voting process/candidate list creation section that extracts, in a case where the input image data is of a duplex document, (i) a reference image index of a reference image having a similarity which is not less than a predetermined value from the storage section and (ii) a reference document index corresponding to the reference image index from the storage section, so as to create a front side candidate list and a back side candidate list; and a duplex document determination process section that determines, in a case where the front and back side candidate lists created include a reference image index that corresponds to an identical reference document index, that the images on the duplex document of the input image data are similar to the reference images that correspond to the identical reference document index, respectively.

As a result, determination accuracy is improved in a case where the matching document is duplex and is similar to (matches) the reference document, while avoiding mistaken determination such as determining an image on one side of the matching document as similar to an image on one side of the reference document whereas an image on the other side of the matching document is determined as different to an image on the other side of the reference document.

That is to say, in the case where a reference document is duplex, the reference image is determinable on a basis that the reference document is duplex. Therefore, determination accuracy of similarity is improved with respect to the duplex document.

As such, an effect is attained that an image data output processing apparatus is realized, which image data output processing apparatus can reliably control an output process of an input image data, in a case where the input image data is of a duplex document and includes a document image in which an output process is regulated for example, which image data output processing apparatus (i) determines whether or not an image of the input image data is similar to an image of a reference document, and (ii) controls the output process of the input image data depending on a determination result.

Further, the image data output processing apparatus of the present invention is arranged such that the duplex document determination process section includes: a similarity determination process section that determines whether or not the image of the input image data are similar to the reference image, and if it determines that the image of the input image data is similar to the reference image, determines that a reference image which has a highest similarity with respect to the image of the input image data is the image of the input image data; and a determination result correction process section that corrects a determination result made by the similarity determination process section, the determination result correction process section determining whether or not first candidate reference images, having a highest similarity in the front and back side candidate lists, correspond to an identical reference document index, in a case where the first candidate reference images correspond to the identical reference document index, the determination result correction process section not correcting the determination result made by the similarity determination process section, and whereas, in a case where the first candidate reference images do not correspond to the identical reference document index, the determination result correction process section (i) comparing similarities of the first candidate reference images in the front and back side candidate lists, respectively, so as to regard a reference document corresponding to one of the first candidate reference images having a higher similarity as a candidate document, (ii) determining whether or not a reference image, having a reference document index of the candidate document, is included in the candidate list of the other of the first candidate reference images having a lower similarity, and, in a case where the reference image corresponding to the reference document index of the candidate document is included, (iii) correcting the determination result made by the similarity determination process section with respect to the other of the first candidate reference images having the lower similarity so that the reference image, corresponding to the reference document index of the candidate document, is the image of the other of the first candidate reference images having the lower similarity.

According to the arrangement, in the case where the first candidates in the front and back side candidate lists correspond to different reference document indices, that is, when the reference images are not in a relation of a front and back sides of a same document, the matching result correction process section corrects the determination result of the similarity determination process section to a combination which satisfies a relation of the reference images to be on the front and back sides of a same document.

This allows reliable and short-process determination of similar images to the reference images on a same reference document in an order of high degree in similarity, even if many image candidates are listed up in the front and back side candidate lists.

Moreover, a determination result made by the similarity determination process section is to be corrected. Therefore, the similarity determination process section can adopt the conventional arrangement which carries out determination one page by one with respect to a one-side document.

The image data output processing apparatus of the present invention is further preferably arranged such that, in a case where at least one of the images on the duplex document of the input image data is similar to the reference image, the output process control section causes a forced mode in which not only the output process of the input image data of the image that is similar to the reference image but also the output process of the input image data of both the images on front and back sides of the duplex document are regulated. Furthermore, the image data output processing apparatus is preferably arranged such that in a case where regulations of the output processes are set for each of the reference images, a regulation having a highest priority is to be selected in the forced mode.

The image data output processing apparatus of the present invention may be arranged such that the output process is: (i) an image forming process in which the images are formed on a recording material based on the input image data, the apparatus further including image forming means for forming, on the recording material, the image based on the input image data; (ii) a filing process in which the input image data is stored in a storage device, the apparatus further including filing means for storing the input image data to the storage device; or (iii) a transmitting process in which the input image data is transmitted to a receiving device via a network, the apparatus further including transmitting means for transmitting the input image data to the receiving device via the network.

Further, the scope of the present invention includes a control device for use in an image data output processing apparatus which adds, to a conventional image data output processing apparatus, functions equivalent to the image data output processing apparatus of the present invention by installing the control device in the conventional image data output processing apparatus, and an image data output processing method which adds, to the conventional image data output processing apparatus, functions equivalent to the image data output processing apparatus of the present invention by applying the method to the conventional image data output processing apparatus.

The image data output processing apparatus may be realized by a computer. In this case, by operating the computer as each of the sections, the scope of the present invention includes (i) a program causing a computer to function as the sections of the aforementioned image data output processing apparatus and (ii) a computer-readable storage medium for storing the foregoing program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image data output processing apparatus which carries out an output process with respect to input image data, the image data output processing apparatus comprising: an image matching section that (i) extracts features of an image of the input image data and (ii) carries out a determination as to a similarity between the image of the input image data and an image of a reference document based on a comparison made between the features extracted and features of the image of the reference document stored in advance; and an output process control section that controls the output process with respect to the input image data based on a determination result made by the image matching section, wherein the image matching section carries out a matching of the image of the input image data by use of a storage section which stores (i) features of each of images on a front side and a back side of a duplex reference document and (ii) an index for identifying a duplex document including the reference image, the index being stored so as to correspond to an index for identifying each of the images on the front side and the back side of the duplex document, the image matching section further including: a voting process/candidate list creation section that extracts, in a case where the input image data is of a duplex document, for each of the images on the front side and the back side of the duplex document, (i) a reference image index of a reference image having a similarity which is not less than a predetermined value from the storage section and (ii) a reference document index corresponding to the reference image index from the storage section, so as to create a front side candidate list and a back side candidate list; and a duplex document determination process section that determines, in a case where each of the front and back side candidate lists created include a reference image index that corresponds to an identical reference document index, that the images on the duplex document of the input image data are similar to the reference images that correspond to the identical reference document index, respectively.

2. The image data output processing apparatus as set forth in claim 1, wherein the duplex document determination process section includes: a similarity determination process section that determines whether or not the image of the input image data are similar to the reference image, and if it determines that the image of the input image data is similar to the reference image, determines that a reference image which has a highest similarity with respect to the image of the input image data is the image of the input image data; and a determination result correction process section that corrects a determination result made by the similarity determination process section, the determination result correction process section determining whether or not first candidate reference images, having a highest similarity in the front and back side candidate lists, correspond to an identical reference document index, in a case where the first candidate reference images correspond to the identical reference document index, the determination result correction process section not correcting the determination result made by the similarity determination process section, and whereas, in a case where the first candidate reference images do not correspond to the identical reference document index, the determination result correction process section (i) comparing the similarities of the first candidate reference images in the front and back side candidate lists, respectively, so as to regard a reference document corresponding to one of the first candidate reference images having a higher similarity as a candidate document, (ii) determining whether or not a reference image, corresponding to a reference document index of the candidate document, is included in the candidate list of the other of the first candidate reference images having a lower similarity, and, in a case where the reference image corresponding to the reference document index of the candidate document is included, (iii) correcting the determination result made by the similarity determination process section with respect to the other of the first candidate reference images having the lower similarity so that the reference image, corresponding to the reference document index of the candidate document, is the image of the other of the first candidate reference images having the lower similarity.

3. The image data output processing apparatus as set forth in claim 1, wherein, in a case where at least one of the images on the duplex document of the input image data is similar to the reference image, the output process control section causes a forced mode in which not only the output process of the input image data of the image that is similar to the reference image but also the output process of the input image data of both the images on the front and back sides of the duplex document are regulated.

4. The image data output processing apparatus as set forth in claim 3, wherein: regulations of the output processes are set for each of the reference images, and a regulation having a highest priority is selected in the forced mode.

5. The image data output processing apparatus as set forth in claim 1, wherein the output process is an image forming process in which the images are formed on a recording material based on the input image data, said apparatus further comprising image forming means for forming, on the recording material, the image based on the input image data.

6. The image data output processing apparatus as set forth in claim 1, wherein the output process is a filing process in which the input image data is stored in a storage device, said apparatus further comprising filing means for storing the input image data to the storage device.

7. The image data output processing apparatus as set forth in claim 1, wherein the output process is a transmitting process in which the input image data is transmitted to a receiving device via a network, said apparatus further comprising transmitting means for transmitting the input image data to the receiving device via the network.

8. A control device for use in an image data output processing apparatus which carries out an output process with respect to input image data, the control device comprising: an image matching section that (i) extracts features of an image of the input image data, and (ii) carries out a determination as to a similarity between the image of the input image data and an image of a reference document based on a comparison made between the features extracted and features of the image of the reference document stored in advance; and an output process control section that controls the output process with respect to the input image data based on a determination result made by the image matching section, wherein the image matching section carries out a matching of the image of the input image data by use of a storage section which stores (i) features of each of images on a front side and a back side of a duplex reference document and (ii) an index for identifying a duplex document including the reference image, the index being stored so as to correspond to an index for identifying each of the images on the front side and the back side of the duplex document, the image matching section including: a voting process/candidate list creation section that extracts, in a case where the input image data is of a duplex document, for each of the images on the front side and the back side of the duplex document, (i) a reference image index of a reference image having a similarity which is not less than a predetermined value from the storage section and (ii) a reference document index corresponding to the reference image index from the storage section, so as to create a front side candidate list and a back side candidate list; and a duplex document determination process section that determines, in a case where each of the front and back side candidate lists created include a reference image index that corresponds to an identical reference document index, that the images on the duplex document of the input image data are similar to the reference images that have the identical reference document index, respectively.

9. An image data output processing method for carrying out an output process with respect to input image data, said method comprising: an image matching step of (i) extracting features of an image from the input image data and (ii) carrying out a determination as to a similarity between the image of the input image data and an image of a reference document based on a comparison made between of the features extracted and features of the image of the reference document stored in advance; and an output process control step of controlling the output process with respect to the input image data based on a determination result made by the image matching section, wherein the image matching step carries out a matching of the image of the input image data by use of a storage section which stores (i) features of each of images on a front side and a back side of a duplex reference document and (ii) an index for identifying a duplex document including the reference image, the index being stored so as to correspond to an index for identifying each of the images on the front side and the back side of the duplex document, the image matching step further including: a voting process/candidate list creation step of extracting, in a case where the input image data is of a duplex document, for each of the images on the front side and the back side of the duplex document, (i) a reference image index of a reference image having a similarity which is not less than a predetermined value from the storage section and (ii) a reference document index corresponding to the reference image index from the storage section, so as to create a front side candidate list and a back side candidate list; and a duplex document process step of determining, in a case where each of the front and back side candidate lists created include a reference index that corresponds to an identical reference document index, that the images on the duplex document of the input image data are similar to the reference images that correspond to the identical reference document index, respectively.

10. A non-transitory computer-readable recording medium for storing a program for causing a control device as set forth in claim 8 for an image data output processing apparatus to operate, said program causing a computer to function as each of the sections of the image data output processing apparatus.

* * * * *